(12) United States Patent
O'Neill

(10) Patent No.: US 8,950,571 B2
(45) Date of Patent: Feb. 10, 2015

(54) CHAIN AND FLIGHT CONVEYOR

(75) Inventor: Michael L. O'Neill, Lucinda, PA (US)

(73) Assignee: Joy MM Delaware, Inc., Wilmington, DE (US)

(*) Notice: Subject to any disclaimer, the term of this patent is extended or adjusted under 35 U.S.C. 154(b) by 461 days.

(21) Appl. No.: 13/220,020

(22) Filed: Aug. 29, 2011

(65) Prior Publication Data

US 2011/0315520 A1 Dec. 29, 2011

Related U.S. Application Data

(63) Continuation-in-part of application No. 12/062,069, filed on Apr. 3, 2008, now Pat. No. 8,177,049.

(60) Provisional application No. 61/405,404, filed on Oct. 21, 2010.

(51) Int. Cl.
*B65G 19/08* (2006.01)
*B65G 19/20* (2006.01)
*B65G 19/24* (2006.01)

(52) U.S. Cl.
CPC .............. *B65G 19/08* (2013.01); *B65G 19/20* (2013.01); *B65G 19/24* (2013.01)
USPC ............................ 198/731; 198/793; 198/851

(58) Field of Classification Search
None
See application file for complete search history.

(56) References Cited

U.S. PATENT DOCUMENTS

| 2,674,365 A | 4/1954 | Russell |
| 2,761,548 A * | 9/1956 | Long ............................ 198/733 |
| 3,119,276 A | 1/1964 | Pearson |
| 4,461,372 A | 7/1984 | Bekkala et al. |
| 4,766,995 A | 8/1988 | Sterwerf, Jr. |
| 5,088,594 A * | 2/1992 | Edmondson .................. 198/731 |
| 5,096,048 A | 3/1992 | Lachner et al. |
| 5,165,766 A | 11/1992 | Thomas |
| 5,213,199 A | 5/1993 | Braun et al. |

(Continued)

FOREIGN PATENT DOCUMENTS

| CN | 2211981 | 11/1995 |
| DE | 20300239 | 3/2003 |

(Continued)

OTHER PUBLICATIONS

Office Action from the Patent Office of the Russian Federation for Application No. 2009111612 dated May 30, 2013 (8 pages).

(Continued)

*Primary Examiner* — Kavel Singh
(74) *Attorney, Agent, or Firm* — Michael Best & Friedrich LLP

(57) ABSTRACT

A chain driven by two sprockets spaced a short distance apart along their common axial centerline. The chain includes elongated pins that extend beyond the outer surfaces of the chain link plates, on both sides, by a distance about equal to the width of the spaced apart sprockets. The chain is aligned midway between the sprockets, and the sprocket teeth drive on the extended portion of the chain pins. Where a flight is attached to the chain links, the pins are extended still further, to fit into the indentations or holes in the flights. This provides an exposed length of each pin in alignment with the sprocket on each side for driving purposes. The chain has a piece extending between the plates to reduce the likelihood of a pin extending further outside of one side plate or the other. A shoulder on the pin further reduces the likelihood of this happening.

28 Claims, 25 Drawing Sheets

(56) References Cited

U.S. PATENT DOCUMENTS

| | | | |
|---|---|---|---|
| 6,640,534 | B1 | 11/2003 | Harnæs et al. |
| 6,662,932 | B1 | 12/2003 | O'Neill |
| 8,038,558 | B2 | 10/2011 | Klabisch et al. |
| 8,177,049 | B2 | 5/2012 | O'Neill |
| 8,360,912 | B2 | 1/2013 | Klabisch et al. |
| 2002/0129732 | A1* | 9/2002 | Marshall .................. 104/172.1 |
| 2007/0107412 | A1 | 5/2007 | Humcke et al. |
| 2009/0250318 | A1 | 10/2009 | O'Neill |

FOREIGN PATENT DOCUMENTS

| | | |
|---|---|---|
| GB | 671424 | 5/1952 |
| GB | 2458768 | 7/2009 |
| SU | 963922 | 10/1982 |

OTHER PUBLICATIONS

Office Action from the Mexican Institute of Industrial Property (MIIP) Application No. MX2009003537 dated Apr. 9, 2011, 4 pages.
Examination Report from Canadian Intellectual Property Office Application No. 2659730 dated Aug. 15, 2011, 3 pages.
Examination Report from Great Britain Intellectual Property Office Application No. GB0904749.9 dated Jan. 16, 2012, 3 pages.
First Office Action from the State Intellectual Property Office of China for Application No. 200910129914.7 dated Mar. 1, 2012, (English Translation), 8 pages.
PCT/US2011/057168 International Search Report and Written Opinion dated Mar. 20, 2012 (11 pages).
Polish Search Report for Polish Application No. P403621, dated Sep. 4, 2013 (1 page).
Polish Search Report for Application No. P387693 dated May 21, 2009 (2 pages).
Office Action from the Patent Office of the Russian Federation for Application No. 2009111612 dated Mar. 5, 2013 (5 pages—English translation).
PCT/US2011/057168 International Preliminary Report on Patentability dated Apr. 23, 2013 (8 pages).
PCT/US2011/057168 International Search Report dated May 17, 2013 (1 page).
First Office Action from the State Intellectual Property Office of the People's Republic of China for Application No. 201180061017.2 dated Jun. 27, 2014 (26 pages—English translation).
Office action for Chinese Patent Application No. 201210460370.4 dated Jun. 3, 2014 (13 pages).

* cited by examiner

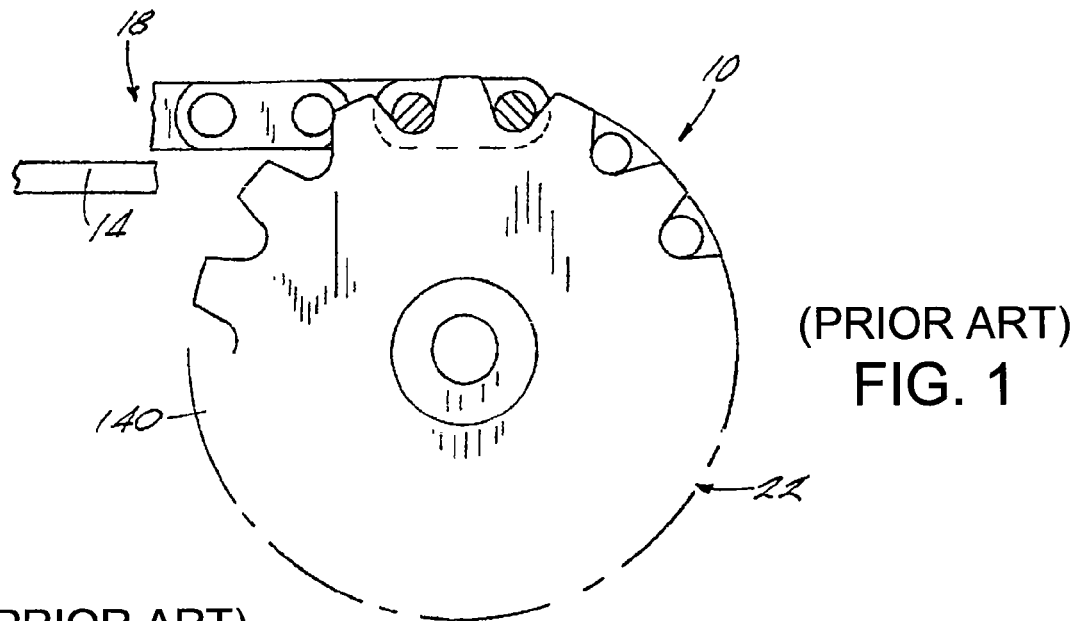
(PRIOR ART)
FIG. 1
(PRIOR ART)
FIG. 3
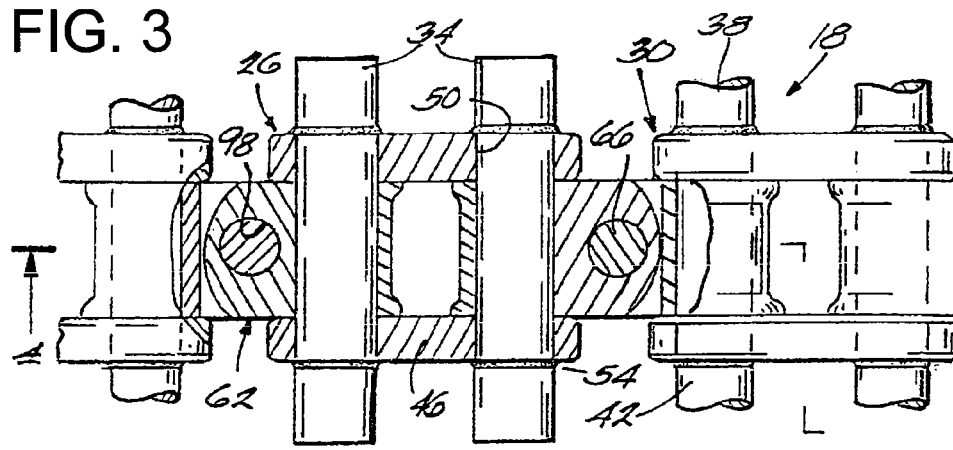
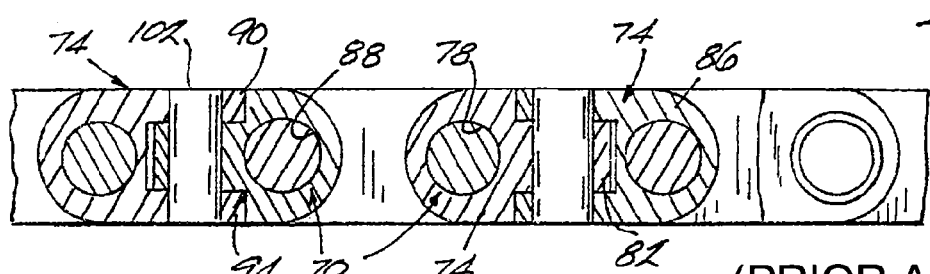
(PRIOR ART)
FIG. 4

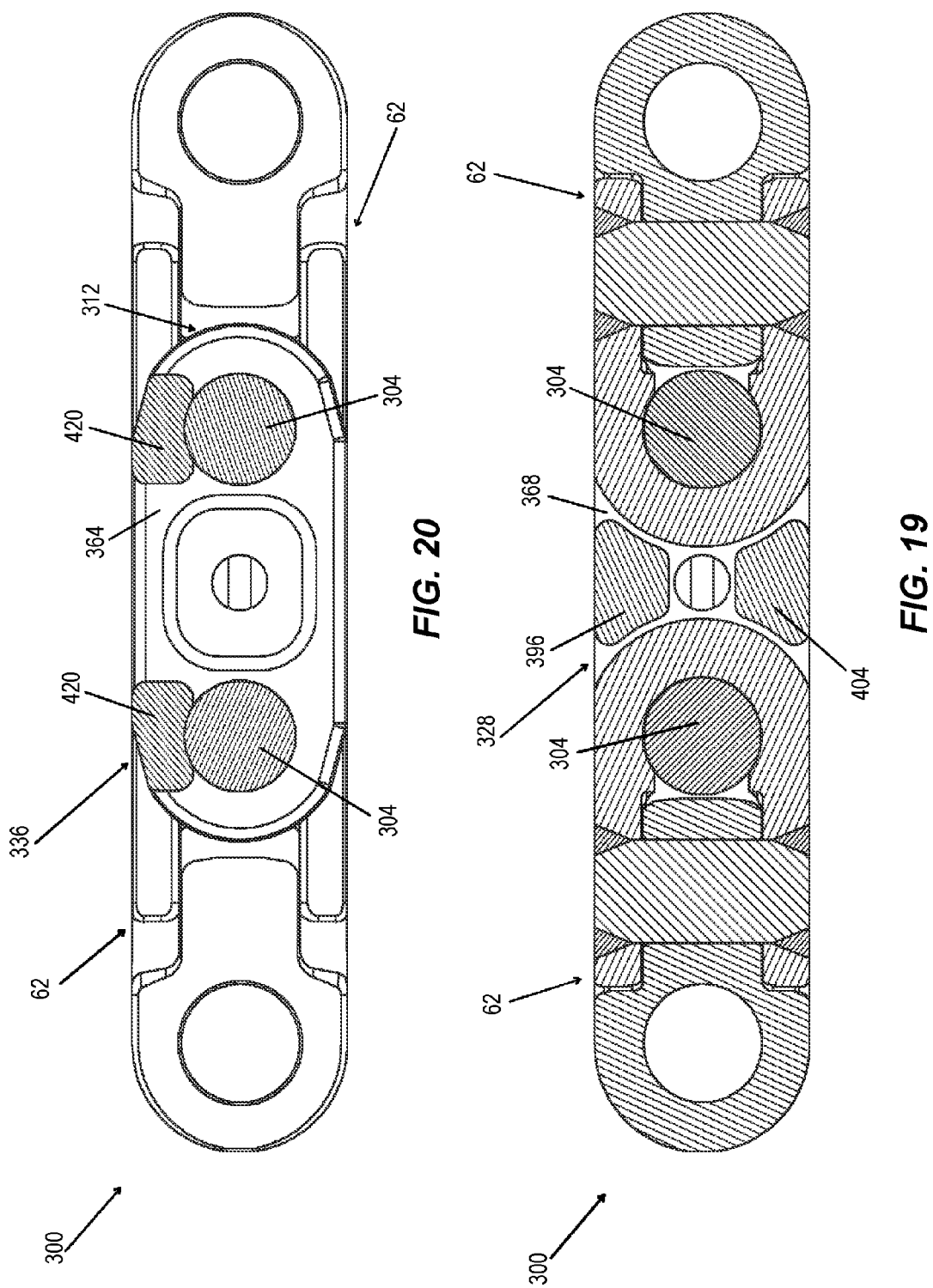

CHAIN AND FLIGHT CONVEYOR

RELATED APPLICATIONS

This application is a continuation-in-part of prior-filed, co-pending U.S. application Ser. No. 12/062,069, filed Apr. 3, 2008, and also claims the benefit of prior-filed, U.S. Provisional Application No. 61/405,404, filed Oct. 21, 2010, the entire contents of both of which are hereby incorporated by reference.

FIELD

This application relates to a chain and flight conveyor for use in conveying materials in the mining industry and, in particular, to a chain and flight conveyor and a drive sprocket assembly. Still more particularly, this application relates to conveyor chains for continuous miners and chain haulage units.

Conveyor chains for use on continuous miners and chain haulage units must have the ability to flex sideways to allow them to make turns. For this purpose, the chains include swivel links. Unlike a link from a standard roller or stud-bushed chain, a swivel link cannot be sprocket-driven on its interior, because the space within it is mostly filled with the swivel pin and the lugs that surround the swivel pin. A swivel link can only be sprocket driven on its outer ends.

U.S. Pat. No. 6,662,932 (the "'932 patent") illustrates a chain and flight conveyor with swivel links. As illustrated in FIGS. 1-4, the chain and flight conveyor 10 of the '932 patent includes a pan or conveying deck 14 of, for example, a continuous miner or a shuttle car, and a conveyor chain and flight assembly 18 that travels over the pan 14. The conveyor 10 also includes a sprocket drive 22.

More particularly, as shown in FIGS. 3-4, the conveyor chain and flight assembly 18 of the '932 patent includes a first link assembly 26 and a second link assembly 30, each of which includes two spaced apart drive pins 34, each of which has a first end 38 and a second end 42. Still more particularly, the chain and flight assembly 18 is formed from a plurality of alternating first link assemblies 26 and second link assemblies 30.

Each link assembly 26, 30 also includes two spaced apart side plates 46, each of which has two spaced apart openings 50, each opening 50 receiving a different one of the drive pins 34. Drive pin retaining means, in the form of press-fitting, retains the drive pins 34 in the side plates 46. The conveyor chain and flight assembly 18 also includes a swivel assembly 62 connecting the two link assemblies 26, 30, the swivel assembly 62 including a swivel pin 66, a male connecting lug 70, and a female connecting lug 74.

More particularly, the male connecting lug 70 has a base 75 with a horizontal bore 78 that receives one of the drive pins of the first link assembly 26, and a tongue 82 connected to the base 75. The female connecting lug 74 has a base 86 with a horizontal bore 88 that receives one of the drive pins of the second link assembly 30, and a spaced apart upper lip 90 and lower lip 94 connected to the base 86. The male connecting lug tongue 82 extends between the spaced apart lips 90 and 94, each of the lips and the tongue having openings therein that form a bore 98 through the male and female lugs that receives the swivel pin 66. Swivel pin retaining means, in the form of a weld, retains the swivel pin 66 in the lugs 70 and 74.

The conveyor chain and flight assembly 18 also includes a first flight 110 (see FIG. 2) connected to one of the first and the second link assemblies 26, 30, the flight 110 having a flight head 114 having two spaced apart openings 118 and 120, each of which receives a different one of the first ends of the drive pins 34. The conveyor chain and flight assembly 18 also includes first flight securing means retaining the drive pin first ends in the first flight head 114 so that the first flight head 114 is spaced from its respective side plate. More particularly, the drive pin first ends are press-fitted or welded to the first flight head 114.

The conveyor chain and flight assembly 18 also includes a second flight 124 connected to the one of the first and the second link assemblies, the flight 124 having a flight head 128 having two spaced apart openings 132 and 136, each of which receives a different one of the second ends of the drive pins 34. The conveyor chain and flight assembly 18 also includes second flight securing means retaining the drive pin second ends in the second flight head 128 so that the second flight head 128 is spaced from its respective side plate. More particularly, the drive pin second ends are press-fitted or welded to the second flight head 128.

In the illustrated embodiment, a pair of such first and second flights 110, 124 is connected to each of the second link assemblies 30. In other embodiments (not shown), the pair of such first and second flights 110, 124 can be connected to the first link assemblies 26.

As illustrated in FIGS. 1-2, the conveyor chain and flight assembly sprocket drive 22 includes two spaced apart drive sprockets 140 and 144, with each of the drive sprockets 140, 144 engaging the drive pins 34 between the side plates and the side plate's respective flight. The chain 10 is driven by the sprockets 140 and 144 spaced a short distance apart along their common axial centerline (see FIG. 2). The chain 10 includes elongated pins 34 that extend beyond the outer surfaces of the chain link plates 46, on both sides, by a distance about equal to the width of the spaced apart sprockets 140, 144. The chain 10 is aligned midway between the sprockets 140, 144, and the sprocket teeth drive on the extended portion of the chain pins 34. Where a flight 110, 124 is attached to the chain links, the pins 34 are extended still further to connect to the flights 110, 124. Accordingly, there is an exposed length of each pin 34 in alignment with the sprocket 140, 144 on each side for driving purposes.

The sprockets 140, 144 are located away from the center of the chain 10 and therefore away from any interference with the swivel link. The sprockets 140, 144 can thus drive the chain 10 on every pitch.

As an alternative to the swivel assembly 62 connecting the two link assemblies 26, 30, a solid link (not shown in FIGS. 1-4 but similar to link 191 shown in FIG. 15) can also provide some limited pivotal movement by providing a loose connection to the link assemblies 26, 30 by having pin receiving openings that are larger than the pins received in the openings. This permits some limited pivotal movement between the links, serving as a partial swivel joint.

Both single sprocket and dual sprocket chains are limited in flight section strength by the size of the pins. The usual mode of failure of these chains is bending of the flight pins. The pins can bend such that the flight section snags in the machine return deck. Additionally, it is possible for the edge of a centrifugal loading arm (CLA) to drop down into the space between the side plates and push the side plates apart. Similarly, other obstructions encountered in the conveyor may snag the upper edges of the side plates and cause them to be damaged.

Press fit connections between the pins and chain flight provide attachment strength and accurate spacing of the chain pins. The press fit connection requires precisely machined holes as well as extra material on the flight to insure that the strength of the flight is not compromised by machining holes on the flights. This adds cost and weight to the chain. In order to provide material on the inner end of the flight, an additional forging technique called upsetting is required in addition to the regular forging operation.

Disclosed embodiments are an improvement to the above subject matter of the '932 patent. More particularly, while the '932 patent included drive pin retaining means in the form of press-fitting or welding of the drive pins in the side plates, welding has proven to be a difficult procedure, especially for field installations. Press-fitting is more field-friendly, but still difficult. Disclosed embodiments may provide relatively easy field assembly of the conveyor chain while addressing the pin movement issues.

A problem encountered with the '932 patent chain has been axial motion of a chain pin, so that the pin extends further from one side of the chain than the other. Because welding has proven to be a difficult procedure, especially for field installations, the pins and link side plates have been joined by press fits. Heavier press fits have been tried and have so far prevented pin movement. However, these heavier press fits have the disadvantage of more difficult chain maintenance.

The mechanism causing pin motion is believed to exist in the underside of the continuous miner conveyor, where the chain moves toward the front of the machine. When the conveyor is hinged sideways, but not to the full extent possible, a gap exists in the side of the conveyor trough. The tension of the chain pulls it sideways in the trough, so that the ends of the chain flights tend to enter the gap. The flights strike the machine frame where the gap ends, and the impact causes the flight section to swivel about the pivoting links. The resulting sideways motion accelerates the side plates transversely, causing relative motion between the side plates and pins.

To limit this relative motion, a positive retention and field-friendly mechanism may be provided between the pin and side plate. More particularly, certain embodiments provide a piece extending between and connected to the side plates to prevent movement of the side plates away from each other.

The invention may provide a conveyor including a pan, and a conveyor chain and flight assembly that travels over the pan. The conveyor chain and flight assembly includes a first link assembly and a second link assembly, each of which includes two spaced apart drive pins, each of which has a first end and a second end, and two spaced apart side plates, each of which has two spaced apart openings, each opening receiving a different one of the drive pins.

In one independent embodiment, the conveyor chain and flight assembly may include drive pin retaining means for retaining the drive pins in the side plates. The drive pin retaining means may include a shoulder on each pin that engages its respective side plate to prevent the side plates, when the side plates engage the shoulder, from moving towards each other.

In one independent embodiment, the conveyor chain and flight assembly may include, for at least one of the first link assembly and the second link assembly, a piece extending between and connected to the side plates to prevent movement of the side plates away from each other.

In another independent embodiment, a chain link assembly for a chain conveyor is provided. The assembly may generally include a pair of pins arranged in parallel and spaced apart from one another, each pin having a first end and a second end; a pair of side plates on the pins, the side plates being arranged in parallel and spaced apart from one another, the pins being connected to and extending between the side plates; and structure connected to and extending between the side plates, the structure preventing at least one of movement of the side plates toward one another and movement of the side plates away from one another.

In yet another independent embodiment, a chain flight assembly may generally include a pair of flight pins, the pins being arranged in parallel and spaced apart from one another, each pin having a first end and a second end; a pair of side plates on the pins, the side plates being arranged in parallel and spaced apart from one another; a pair of flights, one flight being on the first ends of the pins and the other flight being on the second ends of the pins, a first portion of the pins being connected to and extending between one side plate and the one flight, a second portion of the pins being connected to and extending between the other side plate and the other flight; and structure connected to and extending between one of the side plates and an associated flight.

In a further independent embodiment, a chain flight assembly may generally include a pair of flight pins, the pins being arranged in parallel and spaced apart from one another, each pin having a first end and a second end; a pair of side plates on the pins, the side plates being arranged in parallel and spaced apart from one another, the pins being connected to and extending between the side plates; a pair of flights, one flight being on the first ends of the pins and the other flight being on the second ends of the pins, a first portion of the pins being connected to and extending between one side plate and the one flight, a second portion of the pins being connected to and extending between the other side plate and the other flight; first structure, separate from the pins, connected to and extending between the side plates, the first structure preventing at least one of movement of the side plates toward one another and movement of the side plates away from one another; and second structure connected to and extending between each side plate and an associated flight.

In another independent embodiment, a method of manufacturing a chain flight assembly is provided. The method may generally include casting, as a unitary piece, the chain flight assembly, the cast chain flight assembly including a pair of flight pins, the pins being arranged in parallel and spaced apart from one another, each pin having a first end and a second end, a pair of side plates on the pins, the side plates being arranged in parallel and spaced apart from one another, and a pair of flights, one flight being on the first ends of the pins and the other flight being on the second ends of the pins, a first portion of the pins being connected to and extending between one side plate and the one flight, a second portion of the pins being connected to and extending between the other side plate and the other flight.

Further details, independent embodiments and techniques are described in the detailed description below. The summary does not purport to define the invention. The invention is defined by the claims.

BRIEF DESCRIPTION OF THE DRAWINGS

FIG. 1 (prior art) is a side view with a partial cutaway of a continuous miner conveyor chain with flights and showing the drive sprocket engaging the chain.

FIG. 3 (prior art) is an enlarged view of the partially broken away section of the chain shown in FIG. 2.

FIG. 4 (prior art) is a partial cross-sectional view taken along the line 4-4 in FIG. 3.

FIG. 19 is a side cross-sectional view of the chain flight assembly, taken along line 19-19 in FIG. 18.

FIG. 20 is a side cross-sectional view of the chain flight assembly, taken along line 20-20 in FIG. 18

Figure 2:
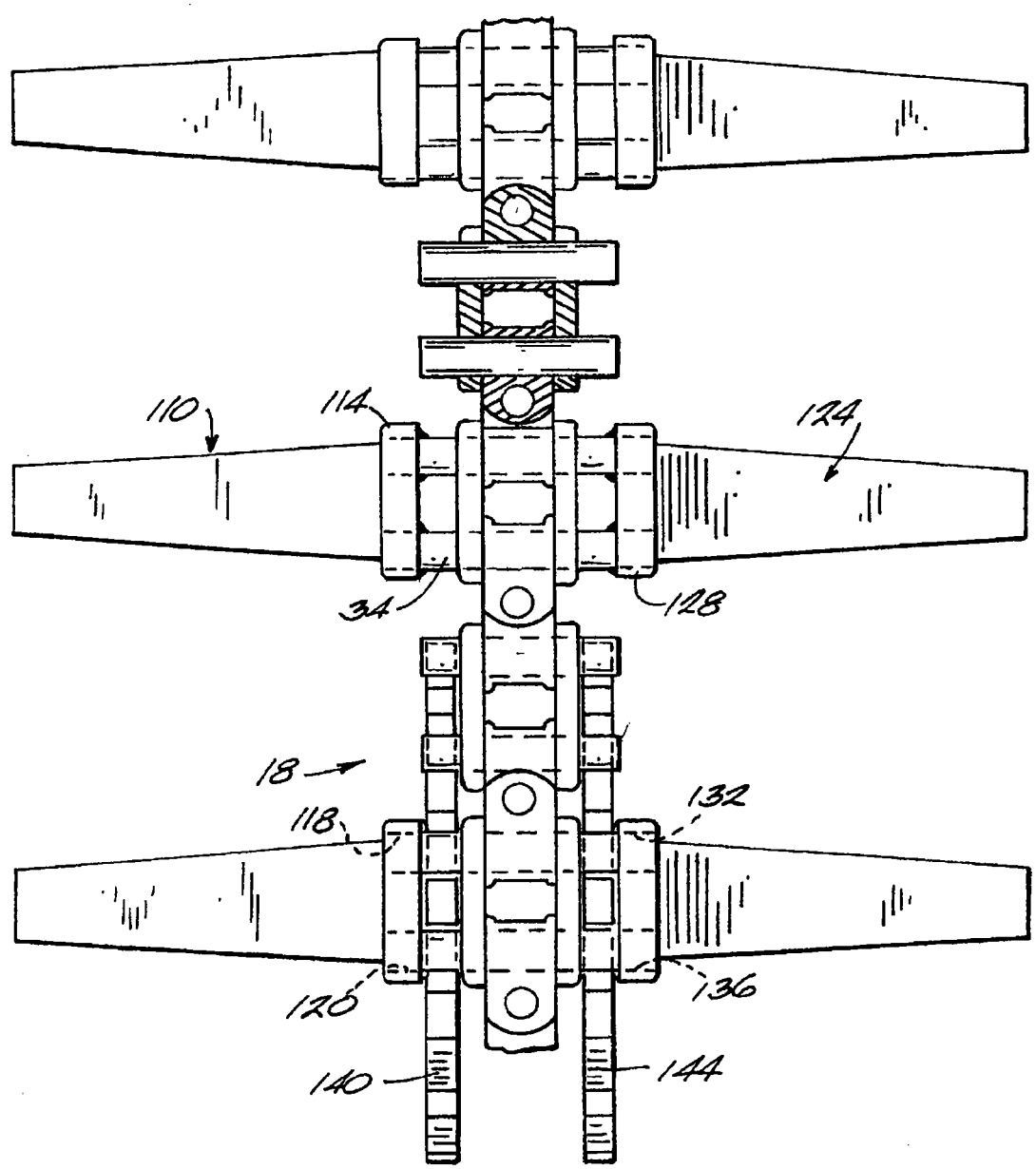
FIG. 2 (prior art) is a plan view of the chain and flight conveyor being driven by the drive sprockets with a portion of one link assembly broken away.

Before any independent embodiments of the invention are explained in detail, it is to be understood that the invention is not limited in its application to the details of the construction and the arrangements of components set forth in the following description or illustrated in the drawings. The invention is capable of other independent embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Further, it is to be understood that such terms as "forward", "rearward", "left", "right", "upward" and "downward", etc., are words of convenience and are not to be construed as limiting terms.

DETAILED DESCRIPTION

Figure 5:
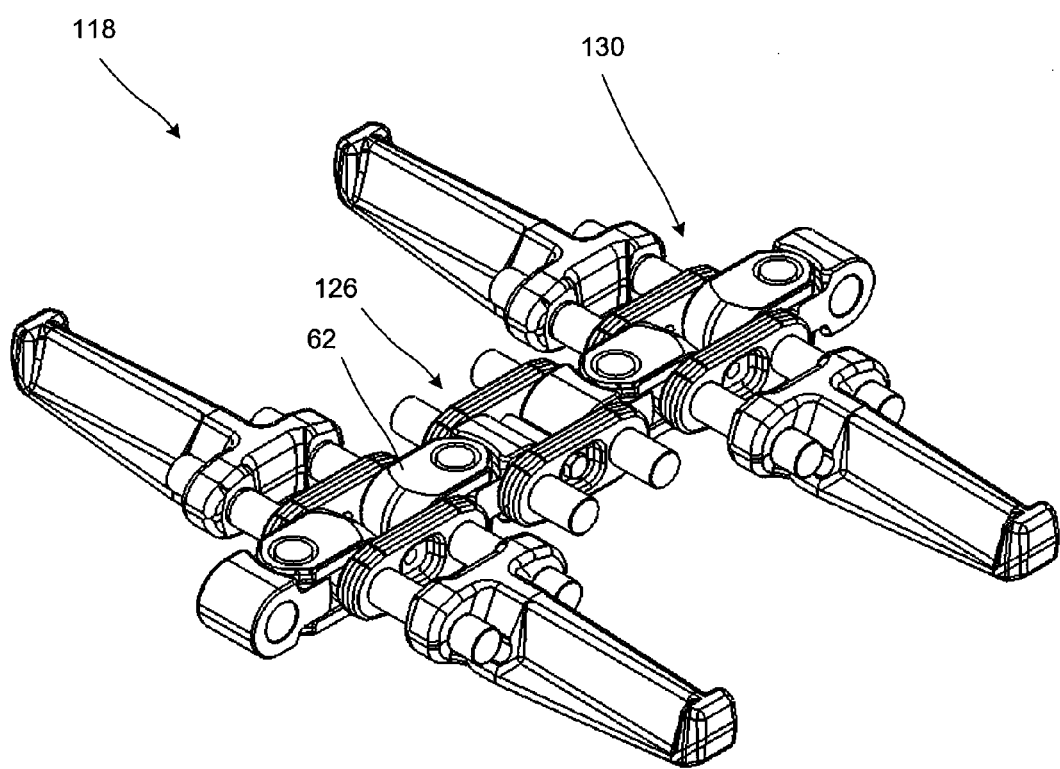
FIG. 5 is a perspective view of a portion of an improved continuous miner conveyor chain with first and second link assemblies and flights attached to the second link assemblies.

Disclosed embodiments may be an improvement to the above subject matter of the '932 patent, description of which may be found in the Summary. More particularly, as shown in FIG. 5, an improvement relates to the structure of the first link assembly 26 and the second link assembly 30. As shown in FIG. 5, a chain and flight assembly 118 for use on a conveyor includes a first link assembly 126 and a second link assembly 130. As before, as shown in regards to the first link assembly 126 in FIGS. 6-13, each link assembly 126, 130 also includes two spaced apart side plates 146, each of which has two spaced apart openings 150, each opening 150 receiving a different one of the drive pins 134. As used herein, interior means between the side plates 146 and exterior means outside of between the side plates 146. The conveyor chain and flight assembly 118 also includes a swivel assembly 162 connecting the two link assemblies 126, 130, the swivel assembly 162 including a swivel pin 66, a male connecting lug 70, and a female connecting lug 74. The assembled chain and flight assembly 118 is shown in cross section in FIG. 14.

Figure 15:
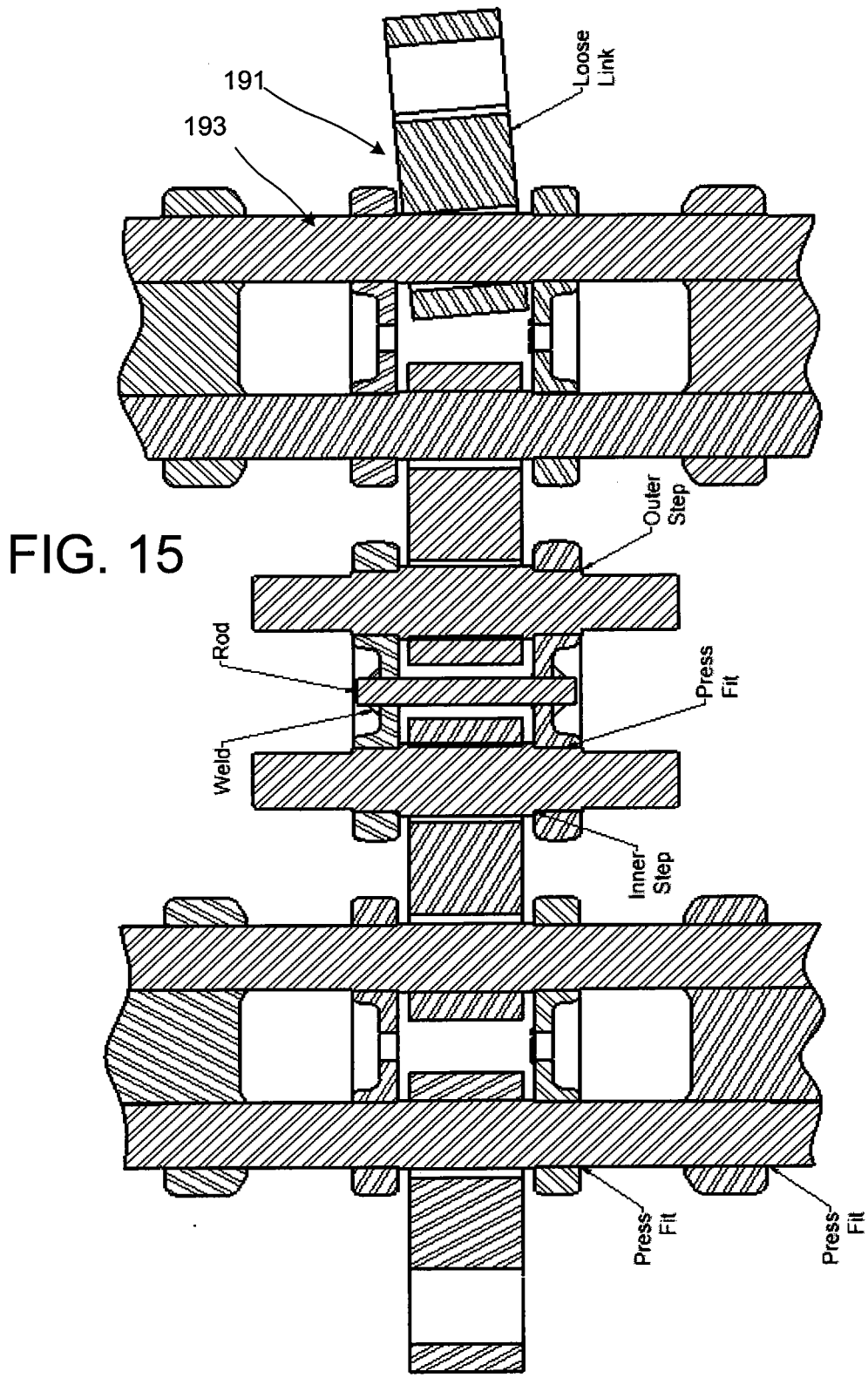
FIG. 15 is another top cross sectional view of a portion of the conveyor chain with first and second link assemblies and flights attached to the second link assemblies, and with a loose link connecting the first and second assemblies.

FIG. 15 illustrates another embodiment of the chain and flight assembly 118 in which, instead of a swivel assembly 162, a solid link 191 is used to provide some limited pivotal movement. The solid link 191 provides a loose connection to the link assemblies 126, 130 by having pin receiving openings that are larger than the pins 193 received in the openings. This permits some limited pivotal movement between the links, serving as a partial swivel joint.

Disclosed embodiments may have two areas of improvement over the '932 patent. More particularly, the drive pin retaining means for retaining the drive pins in the side plates is different than in the '932 patent. In this respect, the drive pin retaining means comprises a shoulder 160 on a pin 161 that engages its respective side plate to prevent the side plates, when the side plates engage the shoulder, from moving towards each other, i.e., toward the chain center. In one embodiment, as further explained below, the shoulder comprises an abutment or inner step 162 on a pin 163. In another embodiment, as further explained below, the shoulder comprises a taper 164 on a pin 165, and a mating taper 166 in the side plate opening 167.

The other improvement is that at least one of the first and second link assemblies also includes a piece, in the form of a bar 170, that extends between and is connected to the side plates to prevent movement of the side plates away from each other. More particularly, the bar 170 can take the form of a tube 172 or spacers 174 and a nut 176 and bolt 178, or a threaded bolt (FIG. 10A), and a bar welded to the side plates, as further explained below. In a preferred embodiment, each of the first and second link assemblies includes such a piece. FIGS. 6-13 illustrate different embodiments of the first link assembly 126. Similar embodiments of the second link assembly 130 are also part of this disclosure.

More particularly, in one embodiment, as shown in FIGS. 6-7 and 9-12, the bar includes a bolt 178 extending transversely between the first and second side plates and received in aligned openings 180 and 182 in the side plates. The bolt 178 has a first end with a head on the exterior of one side plate, and a second threaded end on the exterior of the other side plate. A nut 119 and washer 121 (see FIG. 6) are received on the threaded end. In other embodiments (FIG. 10A), the second end of the threaded bolt 178A can be received in a threaded opening 182A tapped in the side plate 146A. In such embodiments, a Nord-Lock™ washer 184 (manufactured by NORD-LOCK International AB, Mattmar, Sweden) may be provided on the first end of the bolt 178A.

Figure 8:
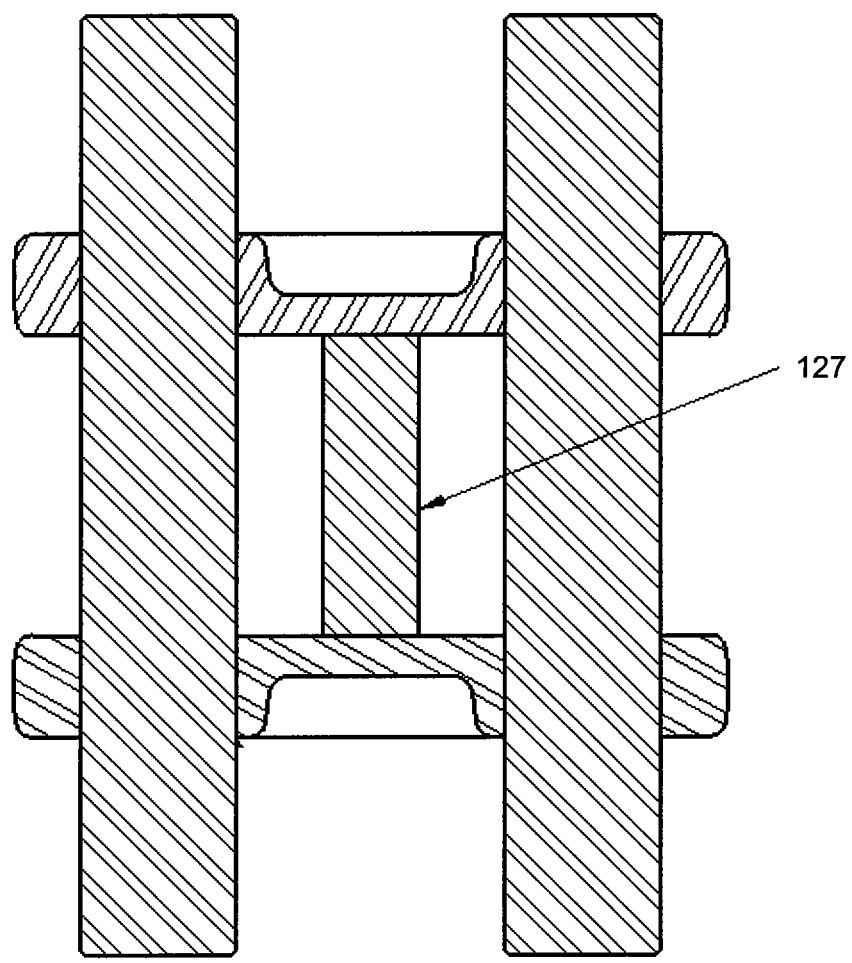
FIG. 8 is a cross sectional view of a third embodiment of the first link assembly.
Figure 13:
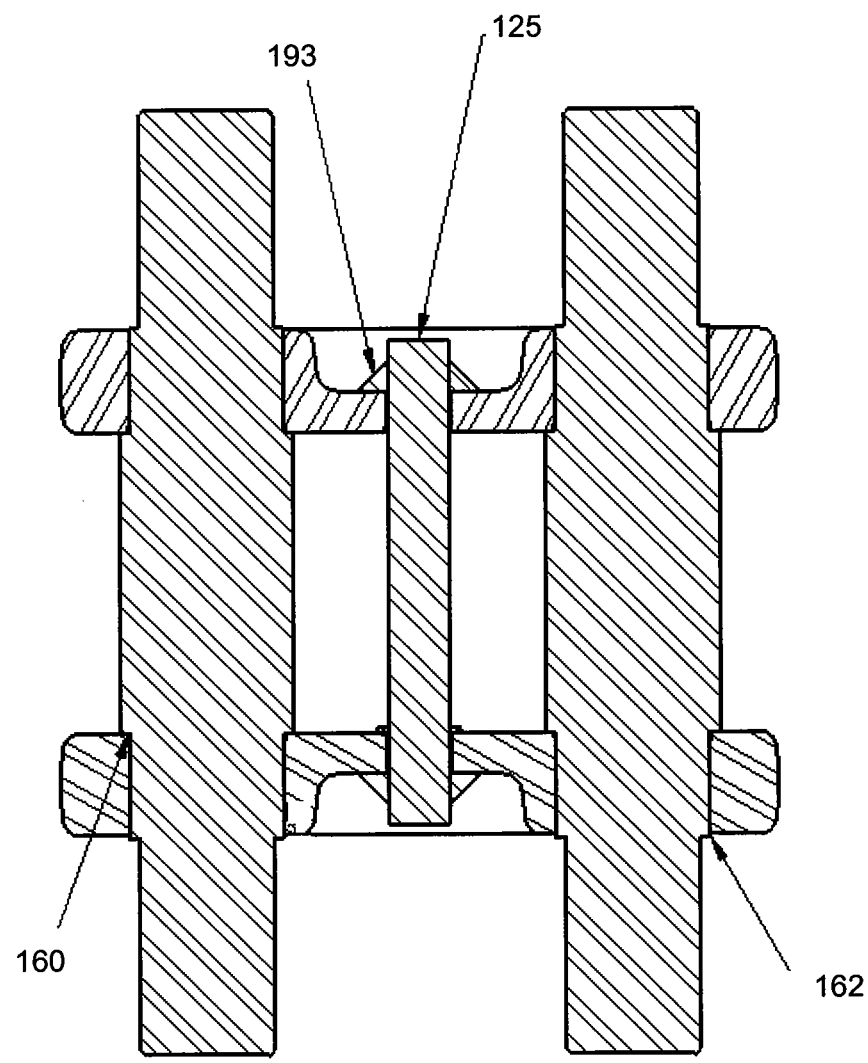
FIG. 13 is a cross sectional view of an eighth embodiment of the first link assembly.
Figure 14:
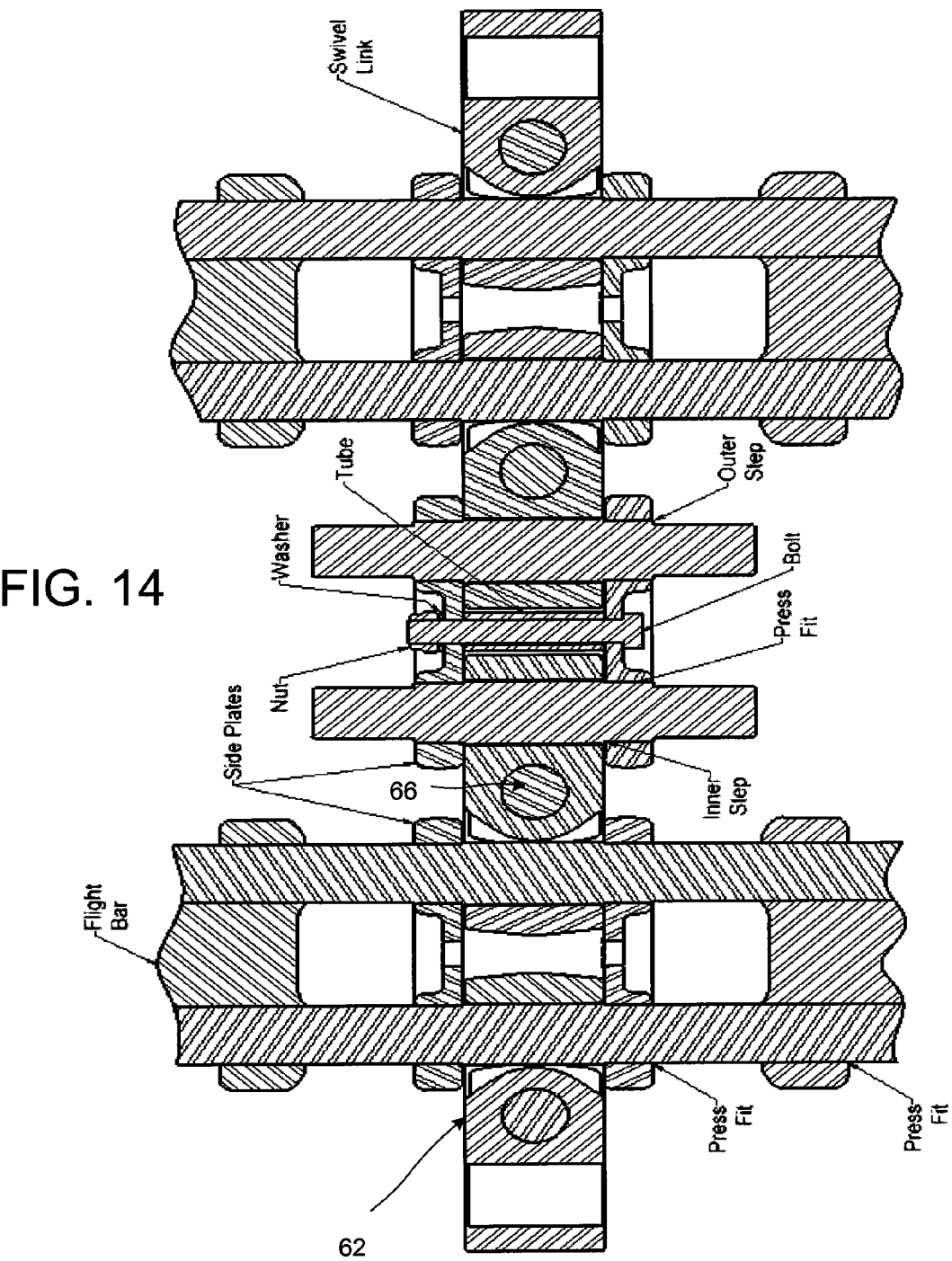
FIG. 14 is a top cross sectional view of a portion of the conveyor chain, as shown in FIG. 5, with first and second link assemblies and flights attached to the second link assemblies, and with a swivel assembly connecting the first and second link assemblies.

In one embodiment, the bar is in the form of a spacer 127, as shown in FIG. 8, or a rod 125, as shown in FIG. 13, welded 193 transverse between the first and second side plates.

Figure 11:
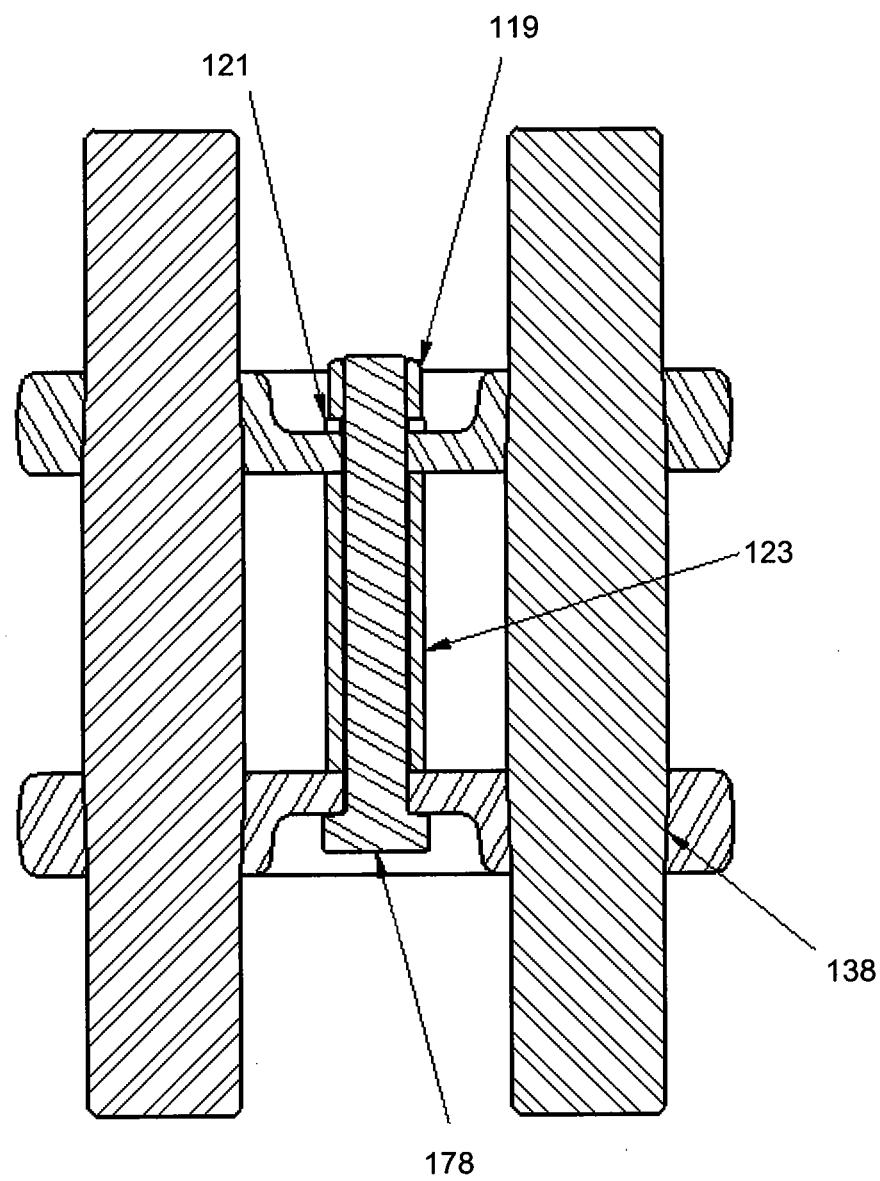
FIG. 11 is a cross sectional view of a sixth embodiment of the first link assembly.
Figure 12:
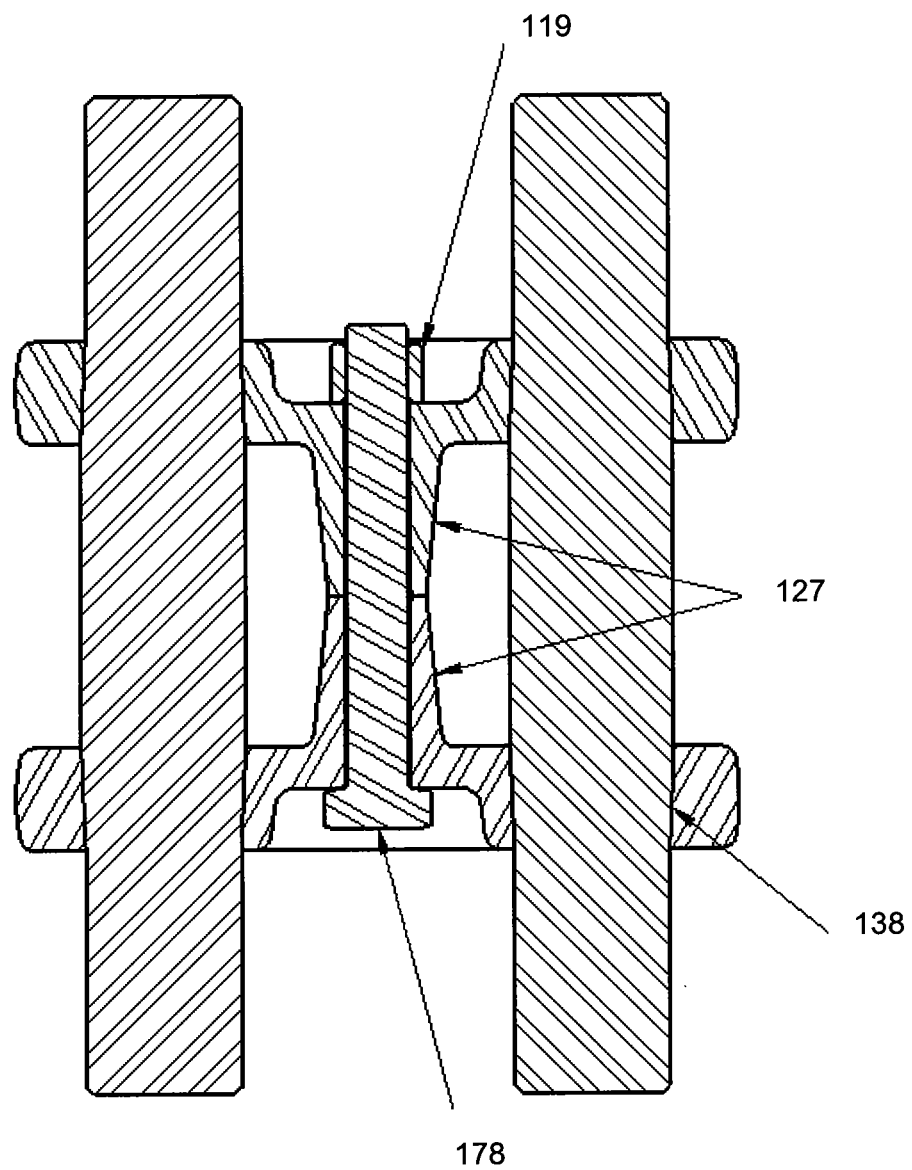
FIG. 12 is a cross sectional view of a seventh embodiment of the first link assembly.

In one embodiment, the bar also includes a tube 123, as shown in FIGS. 6-7, 9 and 11, or a spacer 127, as shown in FIG. 12, that receives the bolt and that extends transverse between the first and second side plates. The tube 123 or the spacer 127 may also prevent the side plates from moving towards one another.

Figure 6:
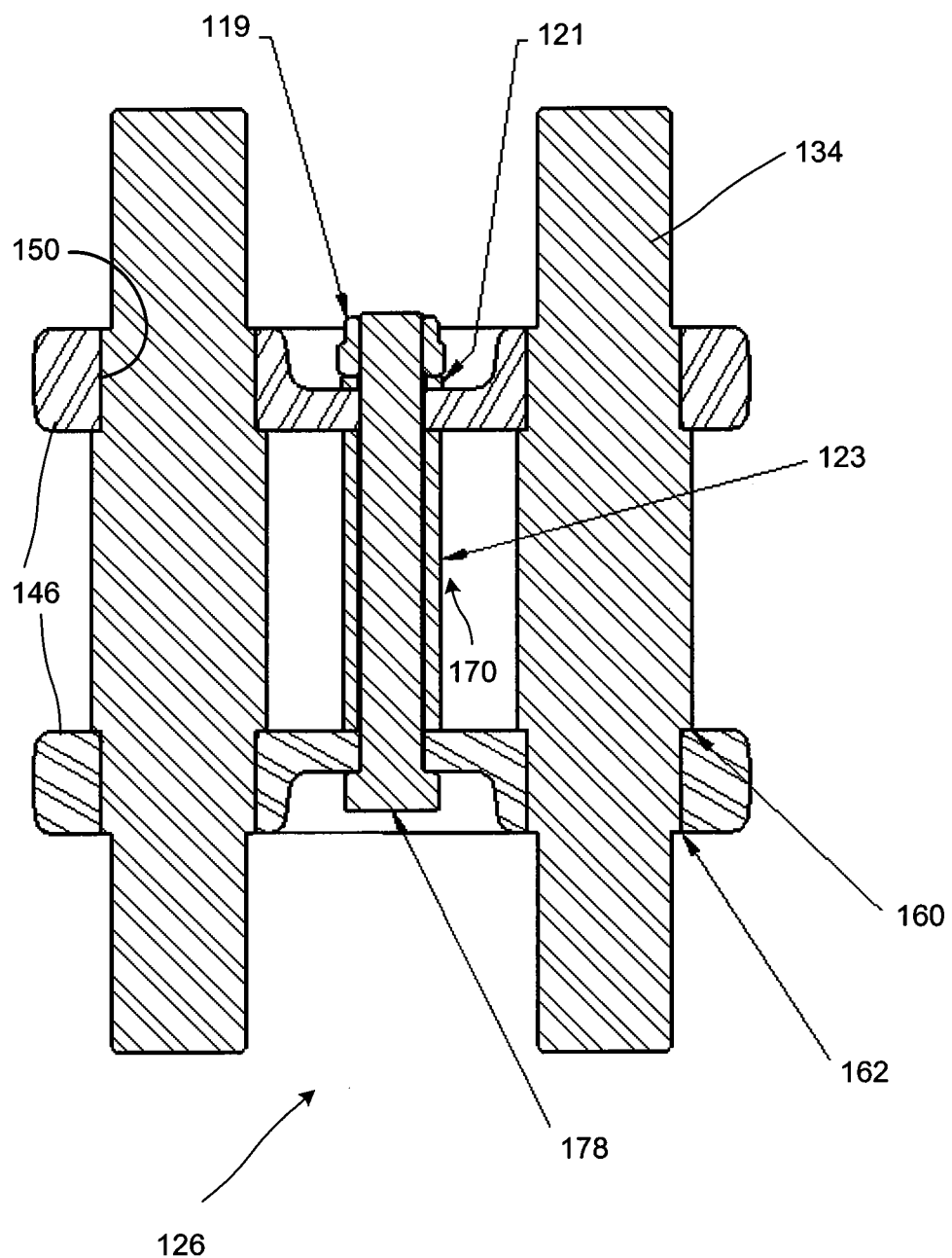
FIG. 6 is a cross sectional view of one embodiment of the first link assembly.

More particularly, in FIG. 6, the pin has two steps 160 and 162 on each end, where there is a change in pin diameter. The inner surface of the side plate is in contact with the inner step 160 of the pin 134, and prevents motion of the side plate toward the center of the chain, or motion of the pin away from the center of the chain. The outer step 162 of the pin serves to reduce the diameter of the pin further, so that there will not be a press fit with the side plate in the portion of the pin that extends beyond the side plate, to make chain assembly and maintenance easier. There can or cannot be a press fit between the pin and the side plate between the two steps, as desired.

The bar 170 keeps the two side plates at a fixed distance, and prevents relative motion between the pins and side plates. Instead of the tube, there can be a protrusion 127, as shown in FIG. 12, made integral to the side plate, which has a face contacting the protrusion from the mating side plate. A bolt 178 is still used to keep the side plates from moving away from each other.

Figure 7:
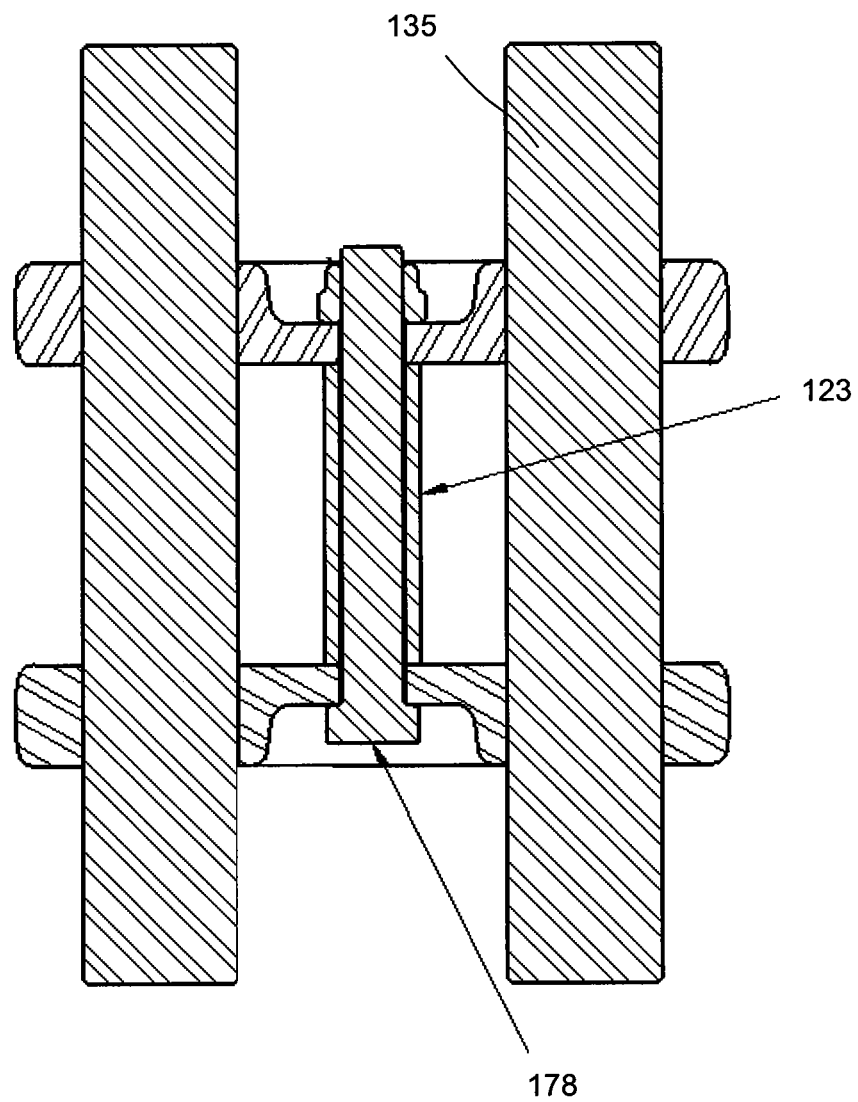
FIG. 7 is a cross sectional view of a second embodiment of the first link assembly.

In FIG. 7, the pins 135 have no steps. The pins 135 are held in the side plates by a press fit. The first link assembly 126 does include, however, a means of keeping the two side plates at a fixed distance. In this case, that means is the bar 170 including a bolt 178, nut 119, and tube 123.

In FIG. 8, which is similar to FIG. 7, except that instead of a bolt, nut, and tube, there is a spacer 127 that is attached to the side plate as by welding. This embodiment would likely be used for those links that have scraper flights attached, because those links are not usually disassembled in service and already undergo a welding process to attach the flights.

Figure 9:
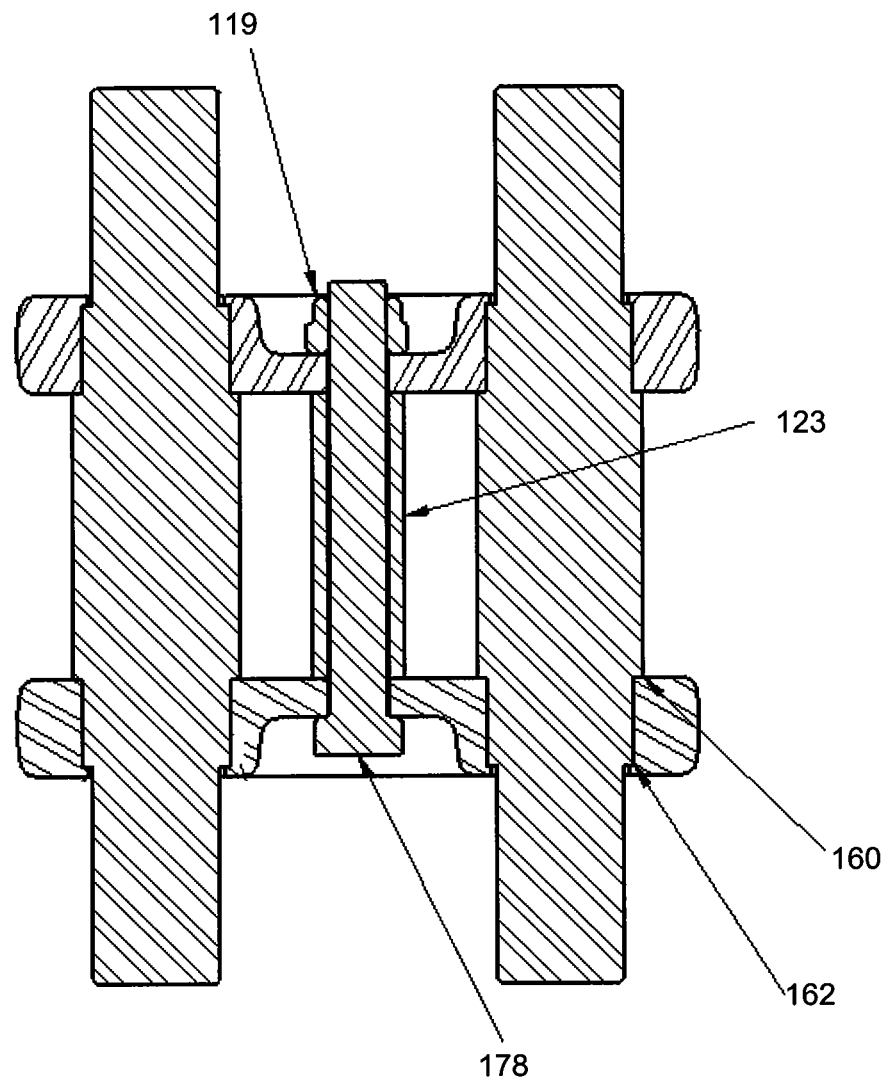
FIG. 9 is a cross sectional view of a fourth embodiment of the first link assembly.

In FIG. 9, the pin has steps, and there is a step in the side plate opening. The step in the side plate bore contacts the step in the pin. A press fit exists for most of the length of the side plate bore. Outboard of the step in the side plate opening, the bore has a clearance fit with the pin.

Figure 10:
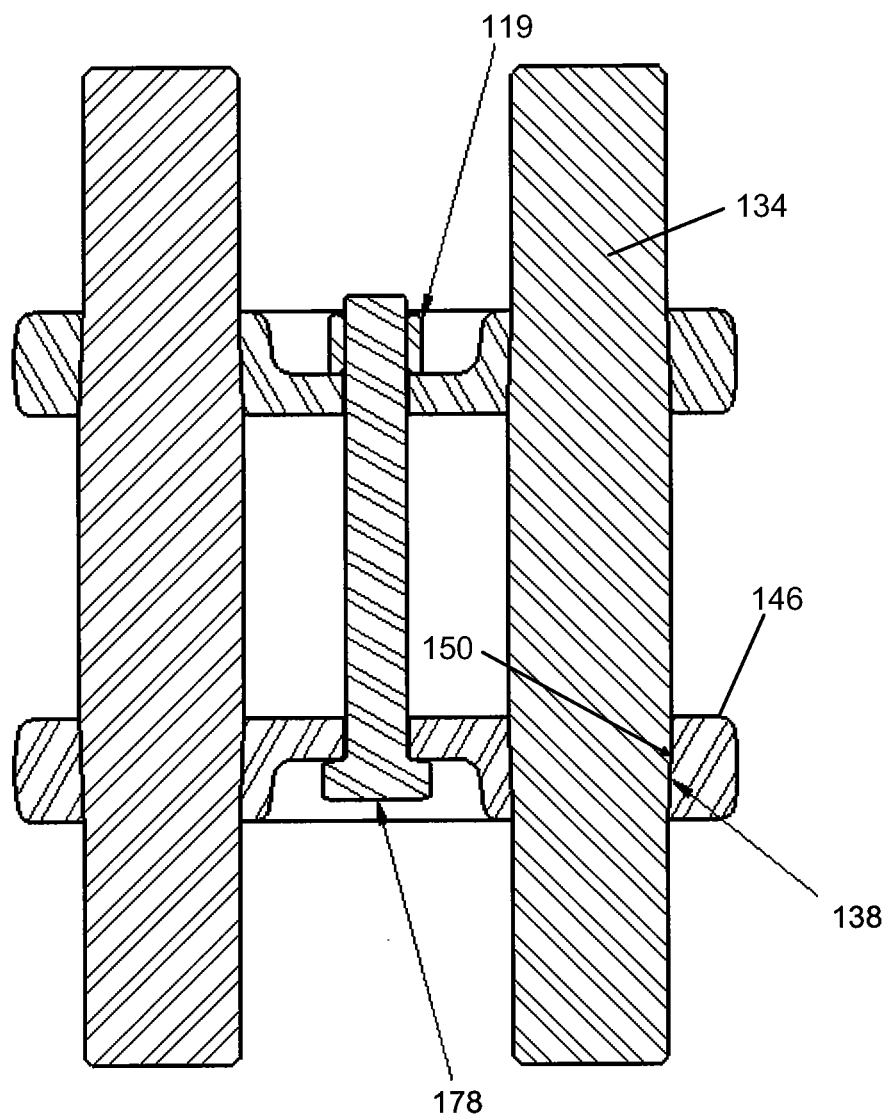
FIG. 10 is a cross sectional view of a fifth embodiment of the first link assembly.

In FIG. 10, the change in diameter in the pins 136 comprises a portion of relatively shallow taper. As illustrated, the total taper is 5 degrees (2.5 degrees from the pin axis to the outer surface). The side plate bores openings are made to a matching taper. A bolt and nut are provided to prevent outward motion of the side plates. An advantage of the construction shown in FIG. 10 is that cylindrical press fits are eliminated, and tightening the bolt and nut can assemble the link assembly. Unthreading the bolt and nut, and tapping one of the side plates with a hammer can disassemble it.

Figure 10A:
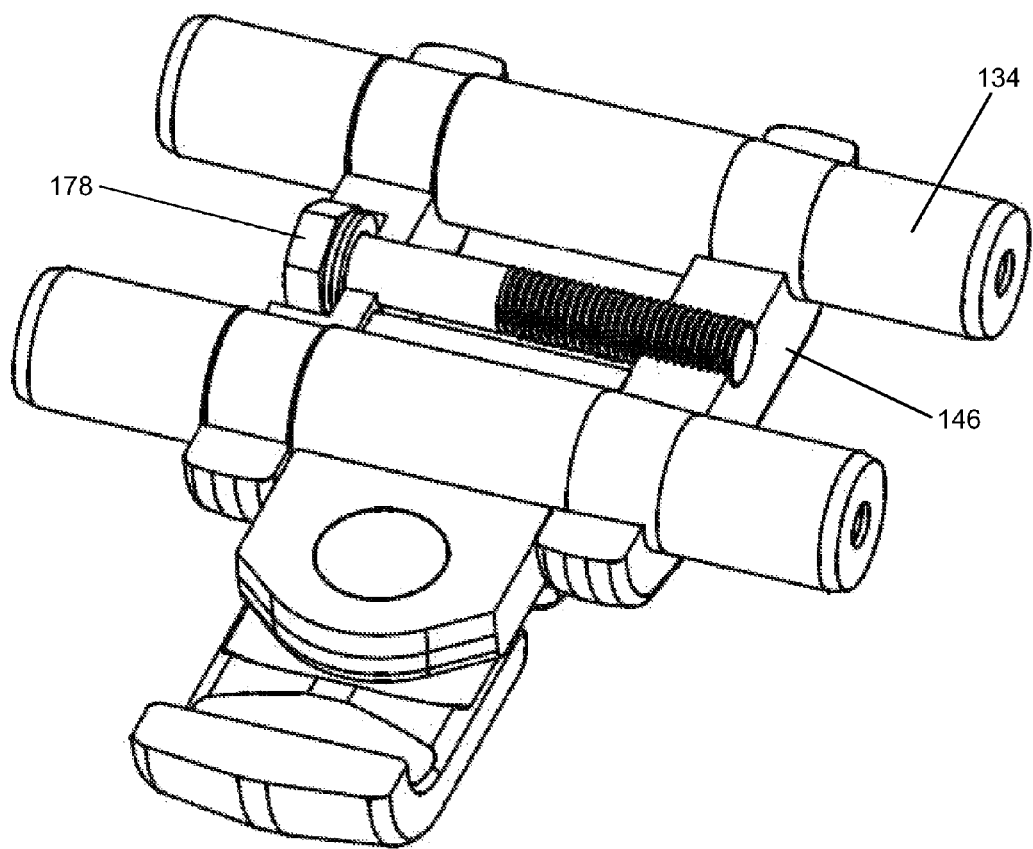
FIG. 10A is a partial cross sectional view of an alternative construction of the first link assembly of FIG. 10.

In the embodiment illustrated in FIG. 10A, a taper fit is provided between one end of the pins 134 and the associated side plate 146, and a press fit is provided between the other end of the pins 134 and the other side plate 146. An indication (e.g., a recess, hole or other marking) is provided on the one end of the pin 134 to identify the taper fit. In other constructions (not shown), the identification may be provided on the other end of the pin 134 to identify the press fit, in addition to or instead of the indication of the taper fit. In still other constructions (not shown), the indication may be provided on the side plate(s) 146, in addition to or instead of the indication(s) on the pin 134.

In FIG. 11, which is similar to FIG. 10, a tube 123 is used, as in FIG. 6. The tube length would be dimensioned so that the side plate contacts the pins on the tapers first. Further tightening of the bolt and nut will cause deflection of the side plates until the inner surfaces of the side plates contact the tube. A purpose of the tube is to prevent excess deflection of the side plates due to bolt tension, which could cause improper seating of the tapered fits. It may also serve to reduce fatigue stress on the bolt and side plates.

FIGS. 16-20 show alternative embodiments of a chain flight assembly 300. Reference numbers for these embodiments begin with "300" to distinguish from the embodiments described above.

Figure 16:
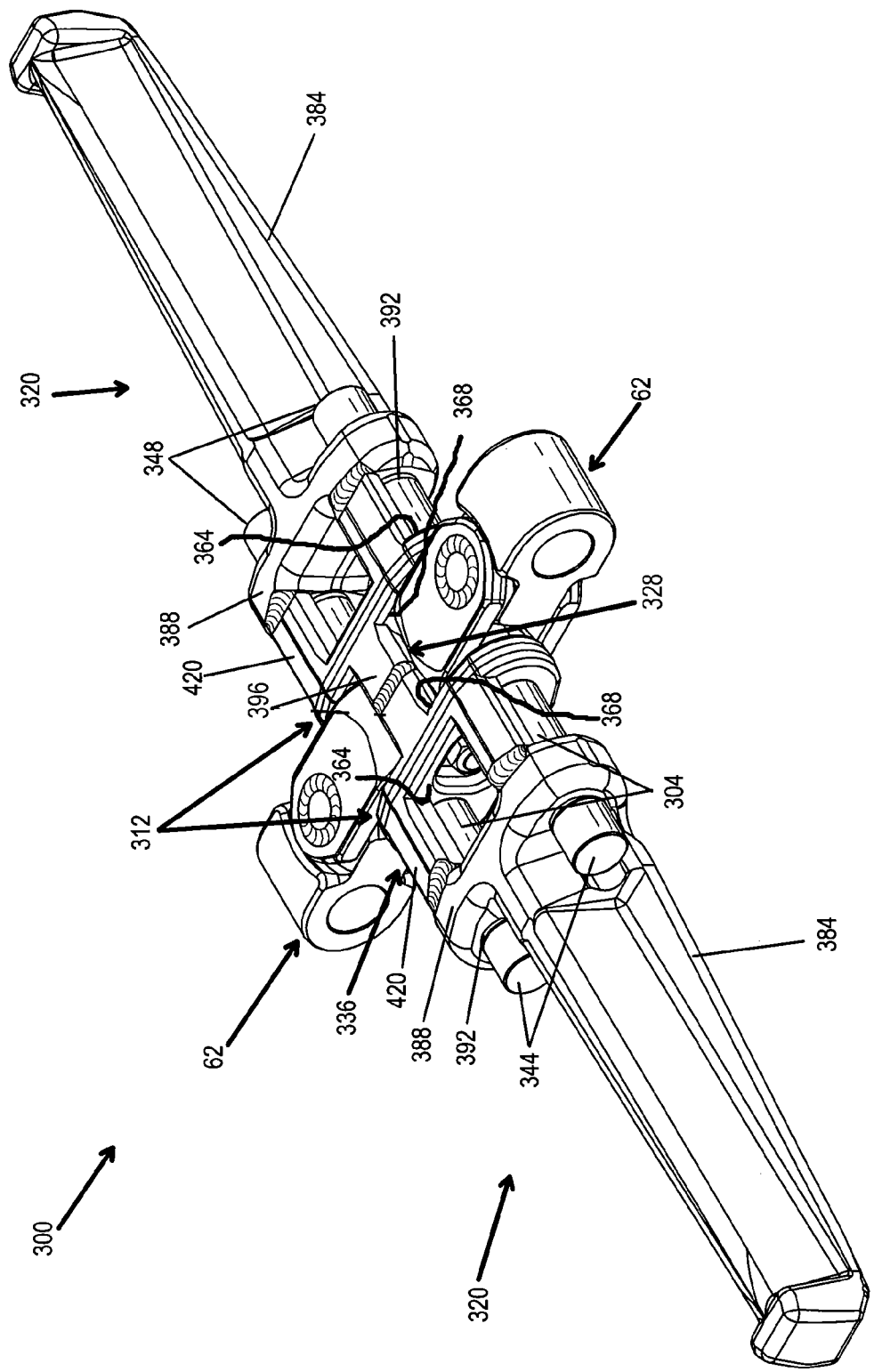
FIG. 16 is a perspective view of an alternative embodiment of a chain flight assembly.
Figure 17:
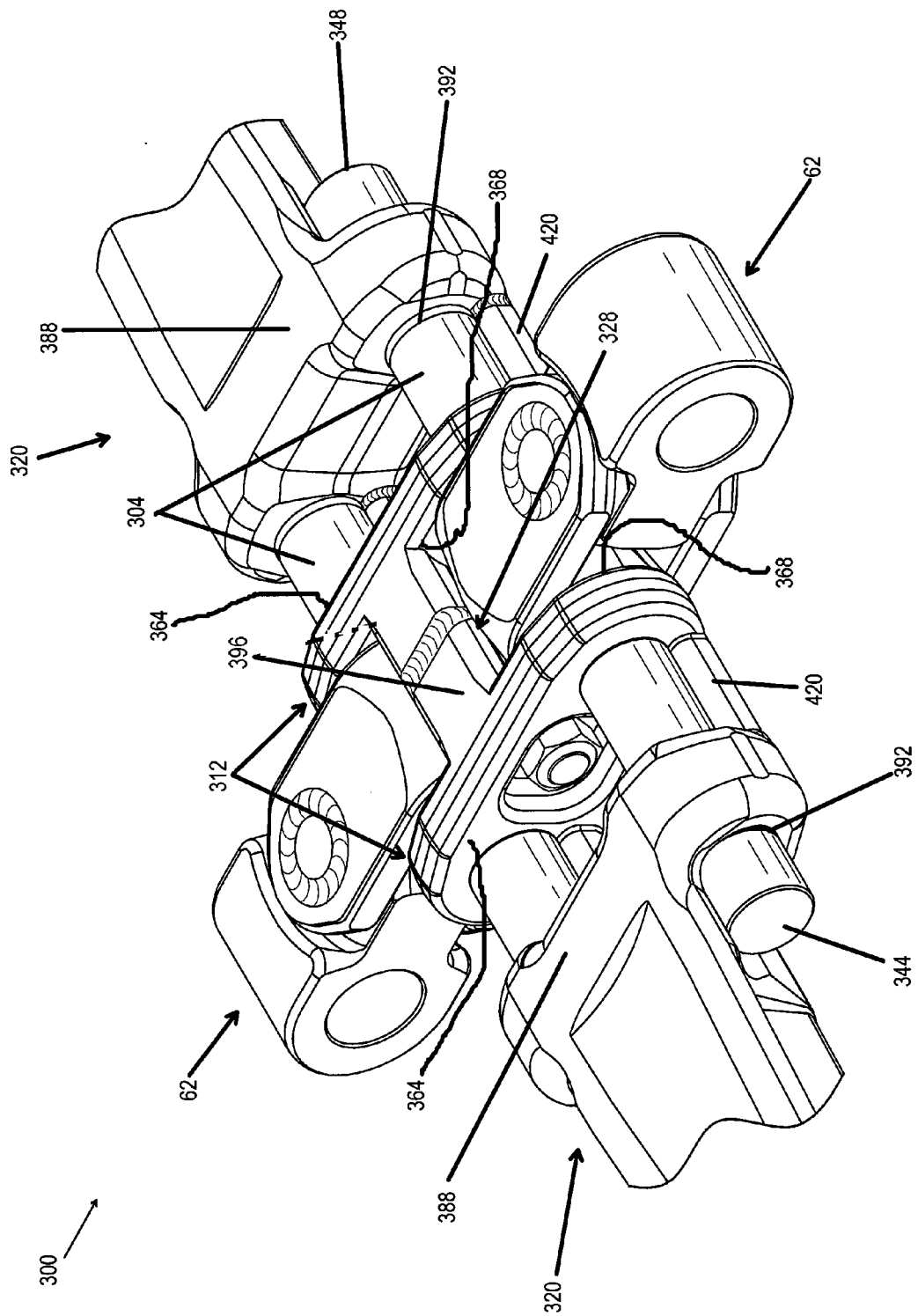
FIG. 17 is an enlarged reverse perspective view of the chain flight assembly of FIG. 16.

As shown in FIGS. 16-17, the assembly 300 includes a pair of flight pins 304, a pair of side plates 312, a pair of flights 320, support structure 328 between the side plates 312 and support structure 336 between each side plate 312 and the associated flight 320. The pins 304 are arranged in parallel and spaced apart from one another, and each pin 304 includes a first end 344 and a second end 348. The side plates 312 are also positioned in a parallel, spaced-apart manner. Each side plate 312 has an outer side 364 and an inner side 368. The side plates 312 are mounted on the pins 304 such that the inner side 368 of one side plate 312 faces the inner side 368 of the other side plate 312. The pins 304 and the side plates 312 define an open area therebetween.

The portion of the pins 304 between the inner sides 368 of the side plates 312 is adapted to receive a swivel assembly 62 for connecting the assembly 300 with adjacent chain links to form the conveyor chain. The swivel assembly 62 is similar to that described above and shown in FIGS. 2-5 and 14. The portion of the pins 304 adjacent the outer side 364 of each side plate 312 receive the teeth of a drive sprocket (not shown but similar to the drive sprockets 140, 144) to move the assembly 300 along a conveyor path.

Figure 21:
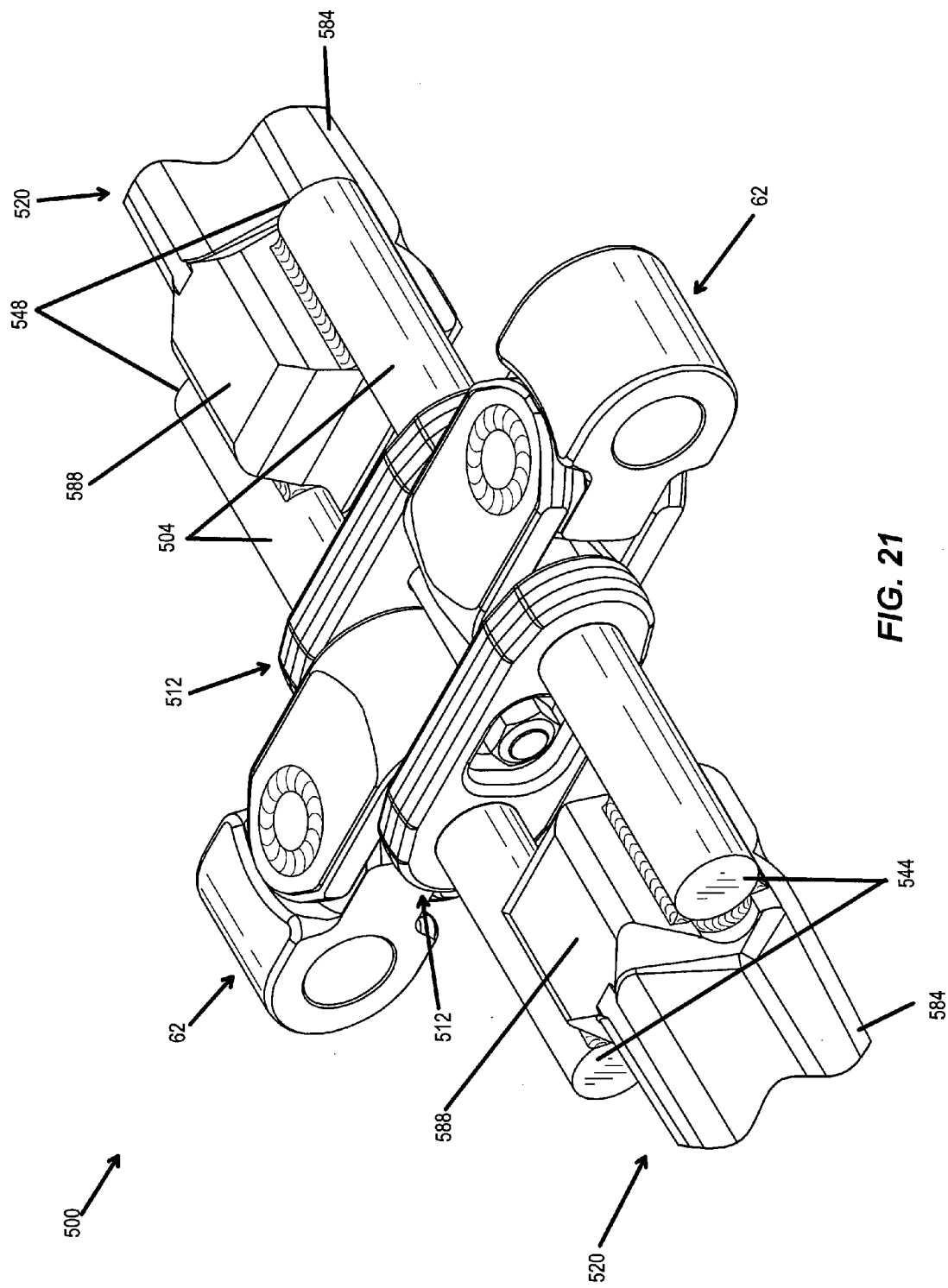
FIG. 21 is an enlarged view of yet another alternative embodiment of a chain flight assembly.

Each flight 320 provides a scraper edge 384 (FIG. 16) and includes a shoulder 388 having a pair of openings 392. The shoulder 388 is arranged parallel to and spaced from the associated side plate 312. The openings 392 of the one flight 320 receive the first ends 344 of the pins 304, and the openings 392 of the other flight 320 receive the second ends 348 of the pins 304. "Opening" generally includes a space or area sufficient to receive a pin 304 for connection to the flight 320 and may include a through-hole (as shown in FIGS. 16-18), a slot or groove (as shown in FIGS. 19-21) which only partially surrounds the pins, or an indentation (e.g., a recess with an end surface) (not shown).

Figure 18:
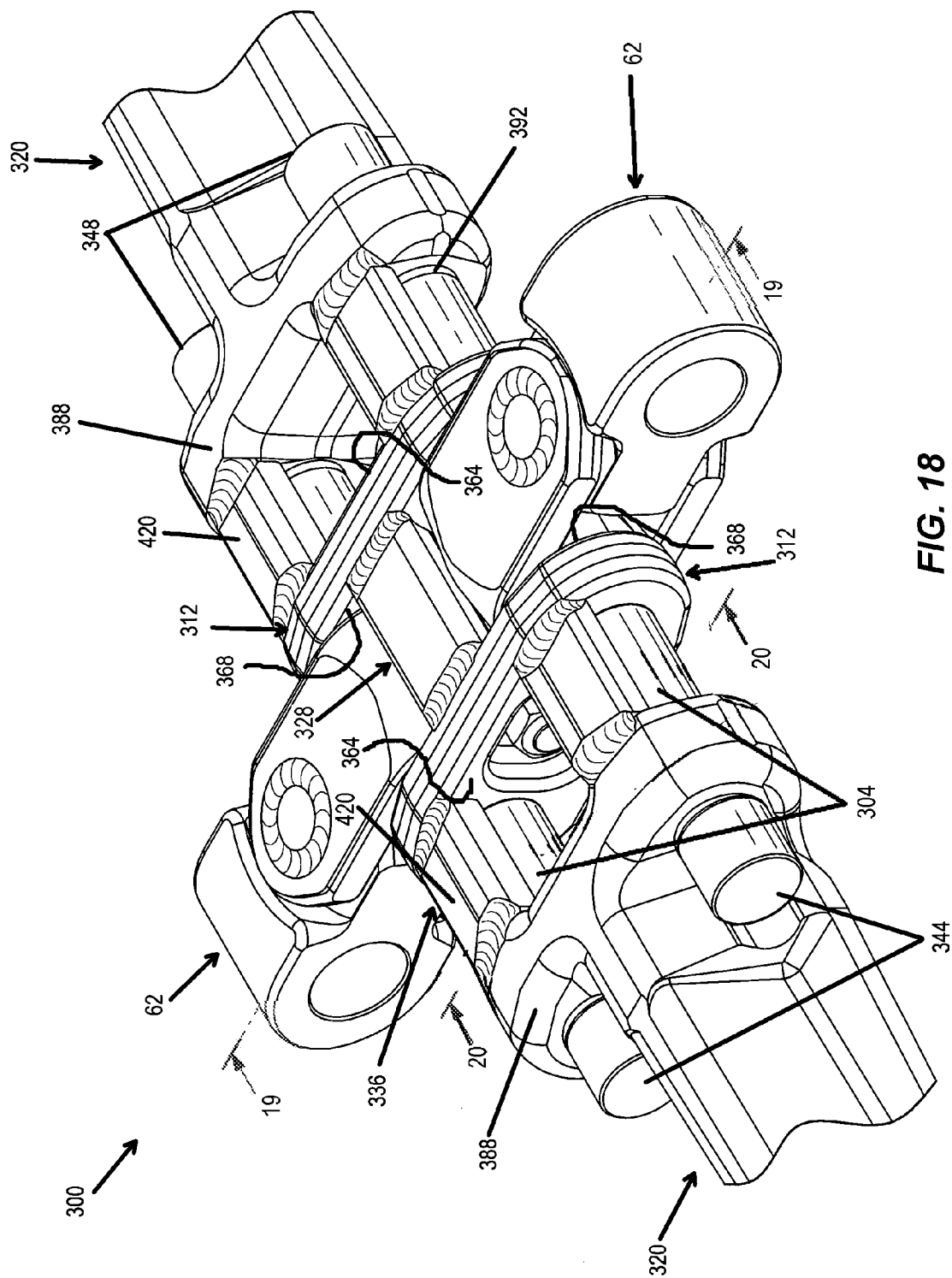
FIG. 18 is an enlarged reverse perspective view of another alternative construction of a chain flight assembly.

In the embodiment of FIGS. 16-18, the pins 304 are secured within the openings 392 by a press fit connection. In other constructions (not shown), a different connection (e.g., welding) may be used.

The pins 304 and the associated side plate 312 and shoulder 388 define an open area therebetween. The portion of the pins 304 the associated side plate 312 and shoulder 388 receive the teeth of the drive sprocket (not shown but similar to the drive sprockets 140, 144) to move the assembly 300 along a conveyor path. The open area accommodates the sprocket teeth.

The support structure 328 extends between the side plates 312 and, in the illustrated construction, includes (see FIG. 19) an upper support 396 (also shown in FIG. 16) on the top of the assembly 300 and a lower support 404 (also shown in FIG. 17) on the bottom of the assembly 300. The support structure 328 is positioned in the open area defined between the pins 304 and the side plates 312, and a clearance is provided between the pins 304 and each of the support 396, 404 to allow insertion of a swivel assembly 62 around the pins 304 and to permit movement of the swivel assembly 62.

In the embodiment illustrated in FIGS. 16-17, the upper support 396 and the lower support 404 include a protrusion formed with and extending from each side plate 312 and joined together, for example, by welding. In other constructions (not shown), the upper support 396 and/or the lower support 404 (rather than only a portion thereof) may be formed integrally with one side plate 312 and connected to the other side plate 312. In an alternative embodiment (see FIG. 18), the upper support 396 and the lower support 404 (not shown) are formed separately from the side plates 312 and joined to the side plates 312. Although the embodiment of FIG. 18 requires additional welding (at each end of the support 396, 404), it may simplify manufacture of the side plates 312.

Referring again to FIG. 16, the support structure 336 includes plates 420 (four in the illustrated construction) secured between the flight shoulders 388 and the outer side 364 of each side plate 312. Each plate 420 is positioned outside of the area engaged by the sprocket teeth. In the illustrated construction (see FIG. 20), each plate 420 is positioned above the associated pin 304 to minimize interference with the sprocket teeth engaging the pins 304, and the support structure 336 and the pins 304 have a non-circular cross-section.

In the embodiment illustrated in FIG. 16, each plate 420 is formed integrally with and extends outwardly from the outer side 364 of the side plate 312. The plate 420 is coupled to the associated shoulder 388, for example, by welding. In other constructions (not shown), each plate 420 may be formed integrally with the flight shoulder 388 and have a free end coupled to the outer side 364 of the side plate 312. In further alternative constructions (not shown), each plate 420 can be formed as a protrusion on the side plate 312 and a protrusion on the flight shoulder 388, with each protrusion being joined together (in a manner similar to that described above with respect to FIG. 16). In yet other alternative construction (see FIG. 18), each plate 420 is formed separately and joined the associated side plate 312 and shoulder 388. Although the embodiment of FIG. 18 requires additional welding (at each end of the plate 420 rather than at only one end), it may simplify manufacture of the side plates 312 and the flights 320.

The addition of the support structure(s) 328 and/or 336 generally improves the strength, rigidity, etc. of the assembly 300. As shown in FIGS. 19-20, the support structure 328 increases the section modulus of the portion of the pins 304 between the side plates 312 (FIG. 19), and the support structure 336 increases the section modulus of the portion of the pins 304 between the flights 320 and the side plates 312 (FIG. 20). In a conventional chain flight assembly, both portions are limited only to the section modulus of the two pins 304. In addition, the top surface of each support structure 328, 336 is, in the illustrated constructions, flush with the top of the side plates 312 and flight shoulders 388, providing a more uniform top surface of the assembly 300 with less opportunity snag on CLAs or other obstructions.

Figure 22:
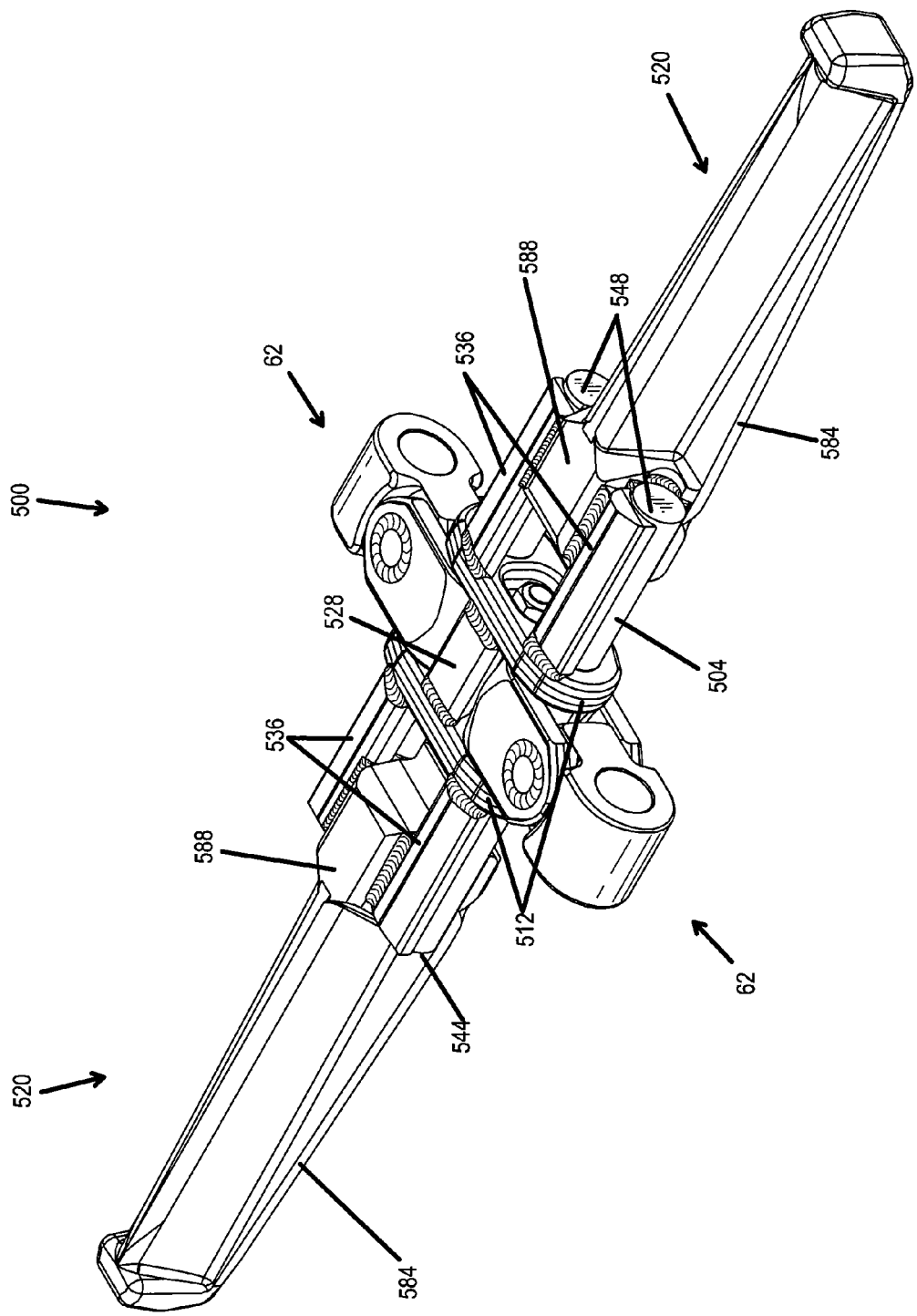
FIG. 22 is a perspective view of the chain flight assembly of FIG. 21 and including support members.
Figure 23:
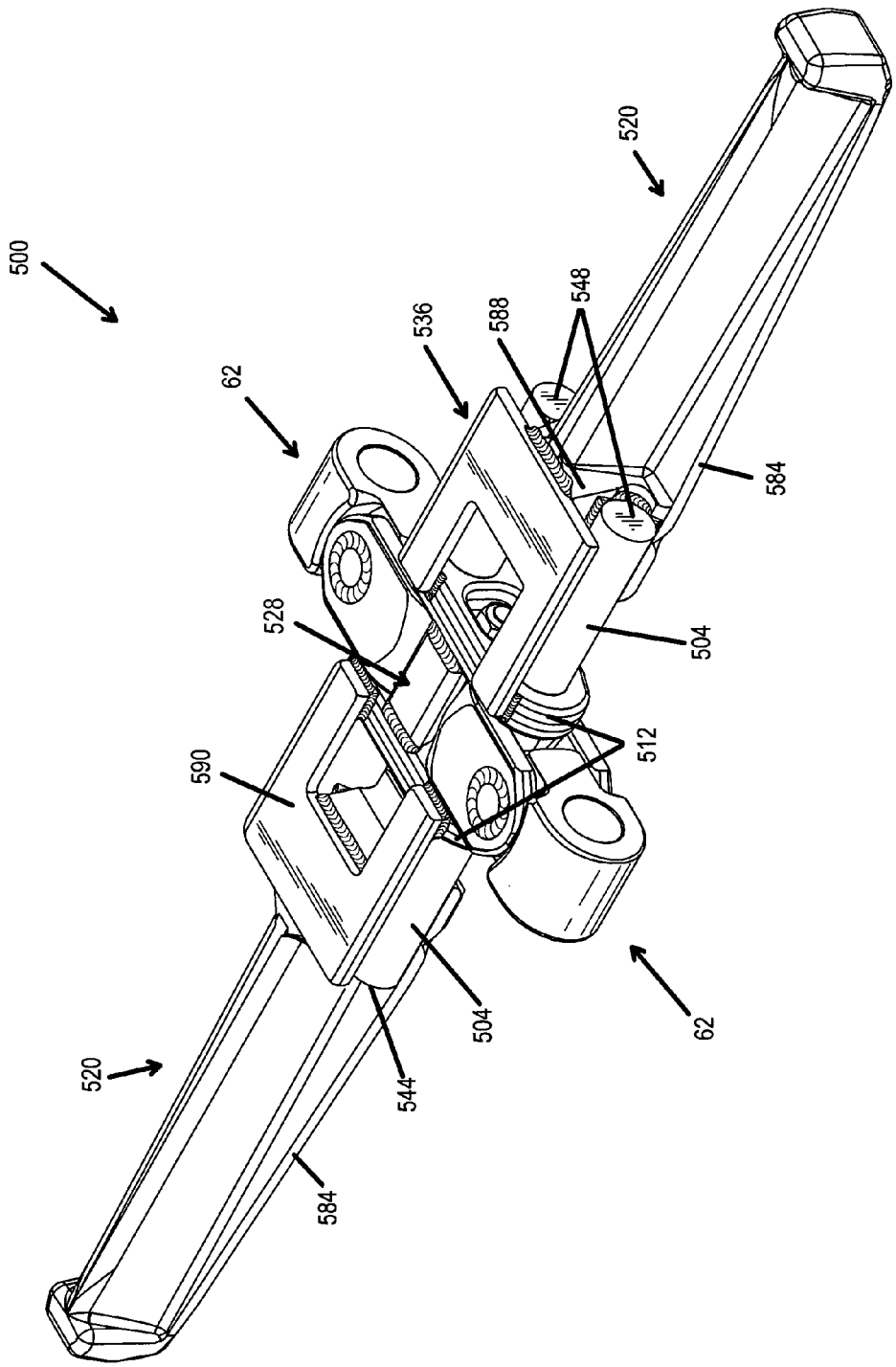
FIG. 23 is a perspective view of the chain flight assembly of FIG. 21 and including an alternative construction of the support members.

In further embodiments, shown in FIGS. 21-23, a chain flight assembly 500 is constructed without press fit connections between pins 504 and flight shoulders 588. For this embodiment, elements that are similar to the elements of the embodiments of FIGS. 16-18 are denoted by the same reference number, plus 200.

As shown in FIG. 21, the flight pins 504 are welded directly onto each flight shoulder 588 without material encircling the outer surface of the pins 504. In the illustrated construction, the side plates 512 are press fit onto the pins 504 in order to ensure that the pins 504 are sufficiently spaced to receive the drive sprocket teeth. Without the press fit on the flight shoulder 588, the exposed portion of each pin 504 is increased. This additional exposure provides additional length for welding the pins 504 to the flight shoulders 588 to provide the requisite strength for the assembly 500. Additional welded joints can be provided on the assembly 500 in addition to those shown in the illustrated embodiment.

In the assembly 500, the side plates 512 are formed to provide accurate spacing of the pins 504. This may allow the press fit connection between the pins 504 and the flight shoulder 588 to be eliminated, simplifying the machining and pressing operations. This may also allow the pins 504 to have a larger diameter, increasing the section modulus (and, therefore, the strength) throughout the assembly 500. The reduction in material of the flight shoulder 588 simplifies fabrication of the flights 520, such that the flights 520 are cheaper, lighter, etc. In addition, the elimination of the material around the flight shoulder 588 may permit the flight 520 to have a longer scraper edge 584, improving the ability of the assembly 500 to carry material along the path of the conveyor.

FIG. 22 shows the assembly 500 of FIG. 21 including support structure 528 secured between the side plates 512 and support structure 536 secured between the side plates 512 and the flight shoulders 588. In a further alternative, shown in FIG. 23, the second support 536 may be formed as a u-shaped plate 590 having a base that is secured to the top of the flight shoulder 588 and arms attached to the side plate 512.

FIGS. 24-27 illustrate another embodiment in which a chain flight assembly 700 is formed as a unitary piece. For this embodiment, elements that are similar to the elements of the embodiments of FIGS. 21-23 are denoted by similar reference numbers, plus 200.

Figure 24:
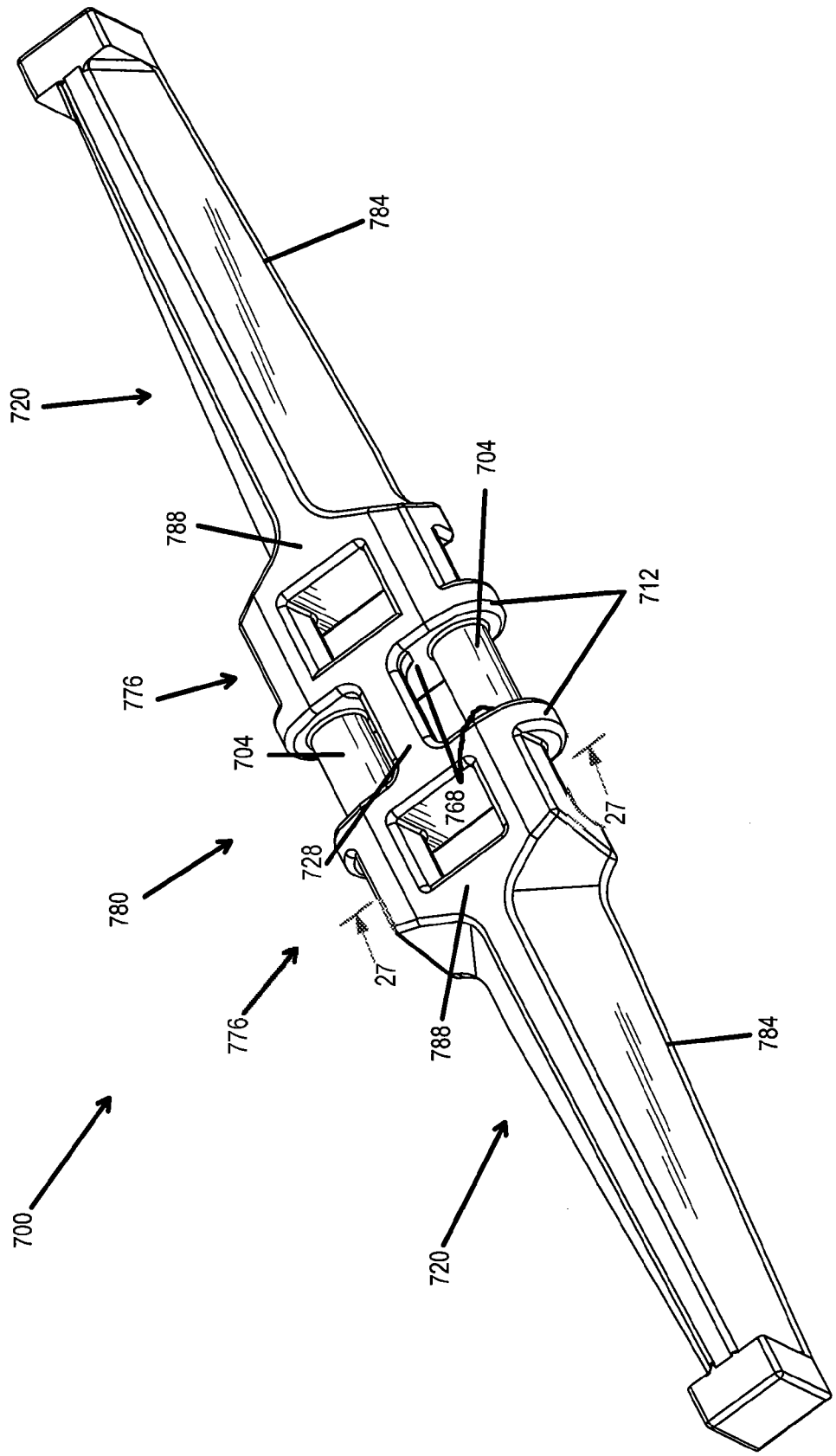
FIG. 24 is a perspective view of a further alternative embodiment of a chain flight.
Figure 25:
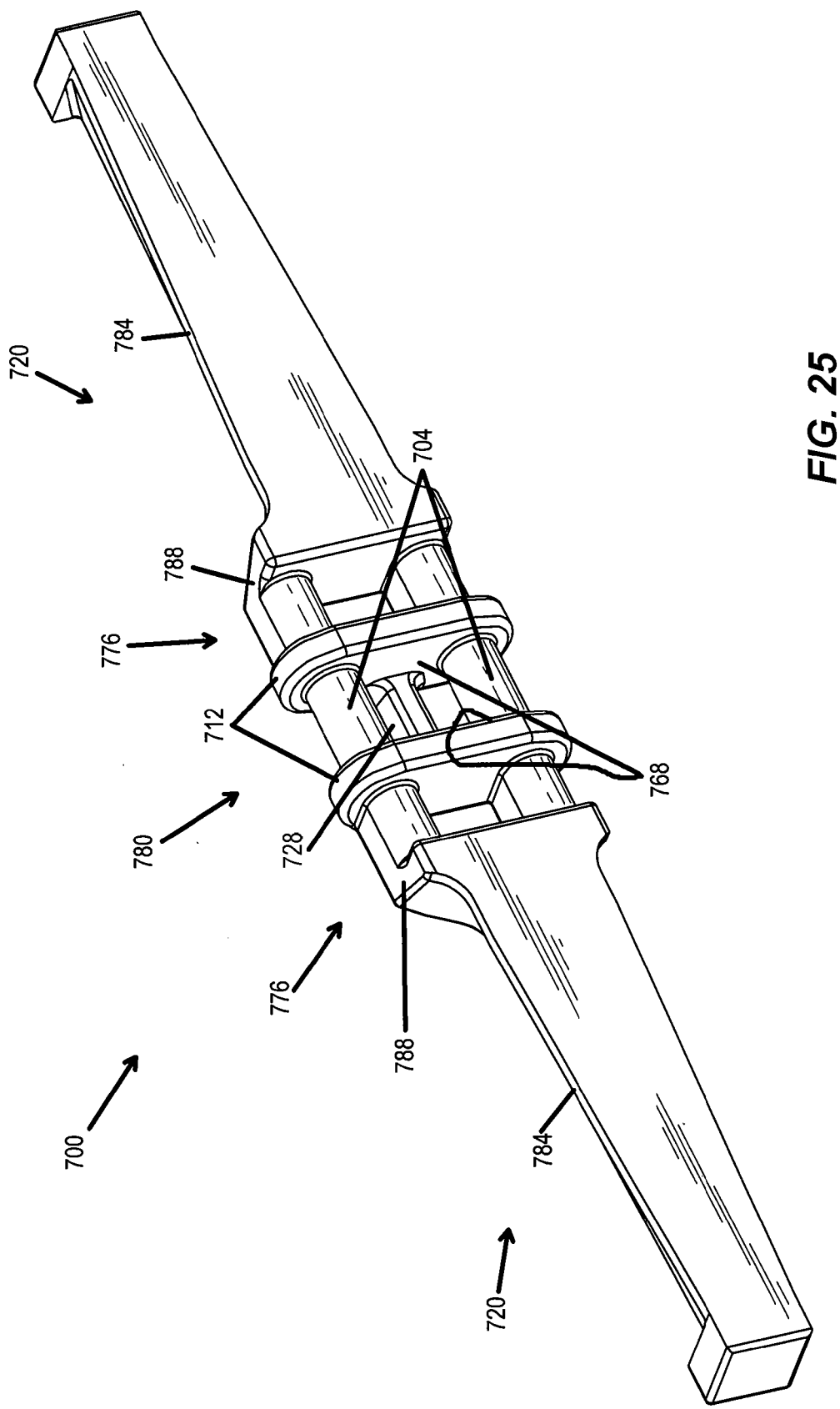
FIG. 25 is a reverse perspective view of the chain flight assembly of FIG. 24.

As shown in FIGS. 24-25, the assembly 700 includes a pair of flight pins 704, a pair of side plates 712, and a pair of flights 720. The illustrated assembly 700 also includes support structure 728, including an upper member 796, between the side plates 712. The support structure 728 may also include a lower member (not shown), though this may add complexity to the process for forming the assembly 700.

Figure 26:
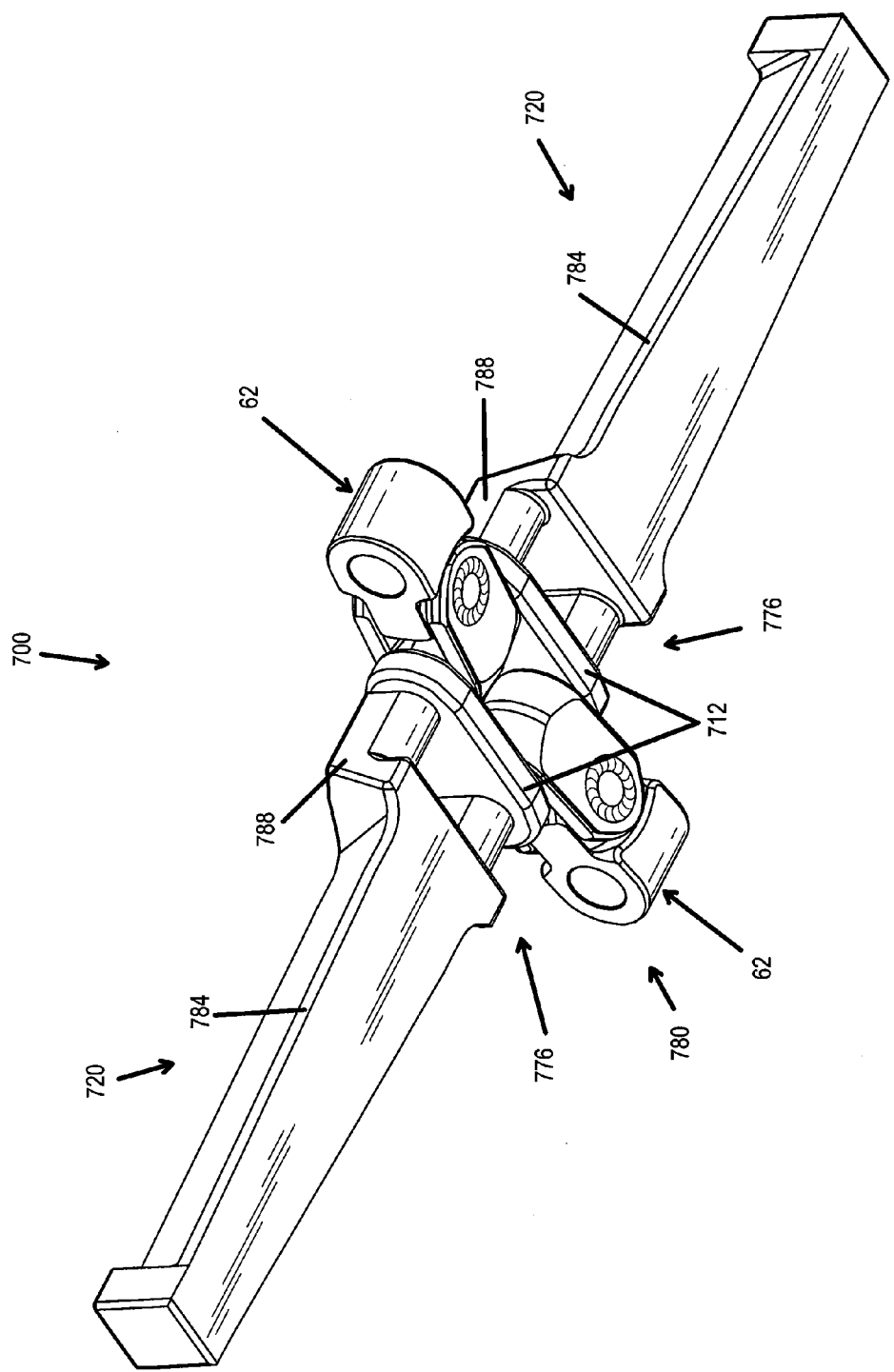
FIG. 26 is a perspective view of a chain flight assembly of FIG. 24, including swivel link assemblies for coupling to another link in a conveyor chain.
Figure 27:
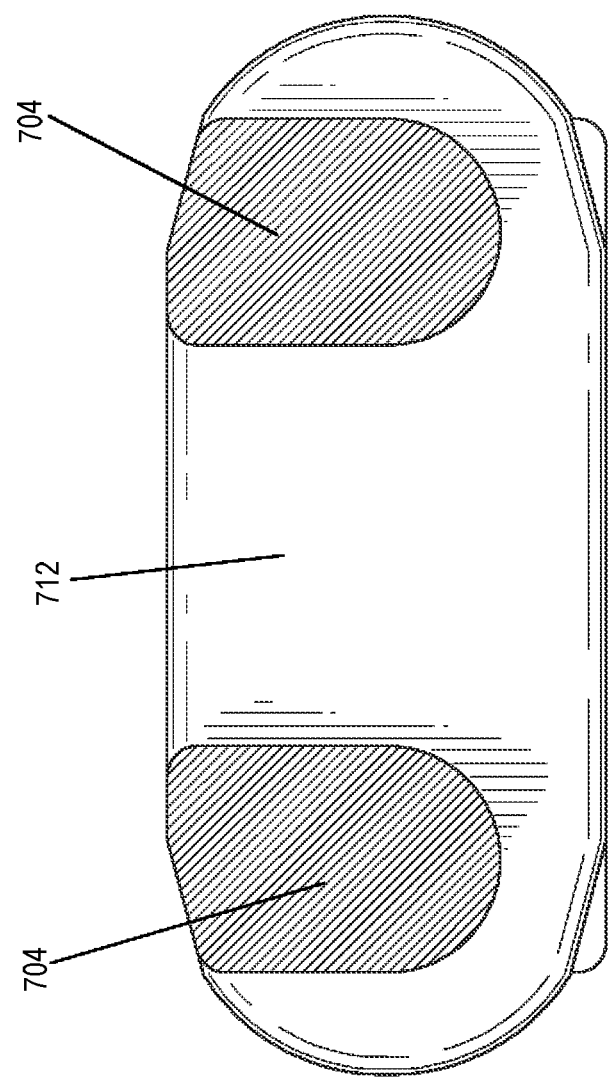
FIG. 27 is a side cross-sectional view of the chain flight assembly, taken along line 27-27 in FIG. 24.

The area between the inner sides 768 of the side plates 712 defines a chain engaging area 780. As shown in FIG. 26, a swivel assembly 62 (as described above in relation to FIGS. 3-5) for connecting the assembly 700 with adjacent chain links to form a conveyor chain, engages the pins 704 in the chain engaging area 780. The support structure 728 does not interfere with the swivel assembly 62.

The area between each flight 720 and each respective side plate 712 defines a sprocket engaging area 776. The illustrated assembly 700 also includes support structure 736 between each side plate 712 and the associated flight shoulder 788. In the illustrated embodiment (see FIG. 27), the support structure 736 is formed with the pins 704. The support structure 736 is outside of the sprocket engaging area 776. The support structure 736 provides the pins 704 with a non-circular cross-section. The illustrated pins 704 are also eccentric relative to the axis of the pins 704.

The assembly 700 may be formed using a lost foam process which permits high precision casting of parts with complicated structures. In the lost foam process, a mold of the assembly 700 is made from polystyrene foam, rather than wax, as is done in an investment casting process. This method of fabrication eliminates several machining and assembly operations, simplifying production of the assembly 700. Alternatively, the assembly 700 may be made using another casting process, such as investment casting.

Thus, the invention may provide, among other things, a chain flight assembly with support structure between the side plates and/or between each side plate and the associated flight. One or more independent features and independent advantages of the invention may be apparent from the following claims.

What is claimed is:

1. A chain link assembly for a chain conveyor, the assembly comprising:
   a pair of pins arranged in parallel and spaced apart from one another, each pin having a first end and a second end extending along an axis;
   a pair of side plates on the pins, the side plates being arranged in parallel and spaced apart from one another, the pins being connected to and extending between the side plates; and
   structure connected to and extending between the side plates, the structure preventing at least one of movement of the side plates toward one another and movement of the side plates away from one another, the structure being positioned solely on one side of the axis of a first of the pair of pins and solely on one side of the axis of a second of the pair of pins.

2. The assembly of claim 1, wherein each side plate has an inner side toward the other side plate and an outer side opposite the inner side, and wherein the structure includes a first member connected to and extending from the inner side of one side plate and a second member connected to and extending from the inner side of the other side plate, the first member and the second member being engageable to prevent movement of the side plates toward one another.

3. The assembly of claim 2, wherein the first member and the second member are connected to prevent movement of the side plates away from one another.

4. The assembly of claim 2, wherein the first member is integrally formed with the one side plate and the second member is integrally formed with the other side plate.

5. The assembly of claim 1, wherein the structure is separate from and connected to both side plates.

6. The assembly of claim 5, wherein each side plate has an inner side toward the other side plate and an outer side opposite the inner side, and wherein the structure includes a support member having one end coupled to the inner side of one side plate and an opposite end coupled to the inner side of the other side plate.

7. The assembly of claim 1, wherein the structure is integrally formed with the pair of side plates.

8. The assembly of claim 1, wherein the structure includes a bolt having a head engaging one of the side plates and a threaded end threadedly engaging the other of the side plates.

9. The assembly of claim 1, wherein the chain link assembly is a chain flight assembly and further comprises a pair of flights, one flight being on the first ends of the pins and the other flight being on the second ends of the pins.

10. The assembly of claim 9, wherein the pair of flight pins, the pair of side plates and the pair of flights are integrally formed as a unitary structure.

11. The assembly of claim 9, further comprising a second structure connected to and extending between one side plate and an associated flight.

12. A chain flight assembly for a chain conveyor, the assembly comprising:
   a pair of flight pins, the pins being arranged in parallel and spaced apart from one another, each pin having a first end and a second end;
   a pair of side plates on the pins, the side plates being arranged in parallel and spaced apart from one another;
   a pair of flights, one flight being on the first ends of the pins and the other flight being on the second ends of the pins, each flight being spaced apart from the side plates, a first portion of the pins being connected to and extending between one side plate and the one flight, a second portion of the pins being connected to and extending between the other side plate and the other flight; and
   structure connected to and extending between one of the side plates and an associated flight.

13. The assembly of claim 12, wherein the structure includes structure connected to and extending between the one side plate and the one flight, and structure connected to and extending between the other side plate and the other flight.

14. The assembly of claim 12, wherein the structure is separate from and connected to the one of the side plates and the associated flight.

15. The assembly of claim 12, wherein each side plate has an inner side toward the other side plate and an outer side opposite the inner side, and wherein the structure includes a support member having one end coupled to the outer side of the one of the side plates and an opposite end coupled to the associated flight.

16. The assembly of claim 12, wherein each side plate has an inner side toward the other side plate and an outer side opposite the inner side, and wherein the structure includes a support member integrally formed with the one of the side plates and the associated flight, the structure having a free end coupled to the other of the one of the side plates and the associated flight.

17. The assembly of claim 16, wherein the support member is integrally formed with the one of the side plates and has a free end coupled to the associated flight.

18. The assembly of claim 12, wherein the conveyor extends along a conveyor axis, and wherein the structure is axially aligned with at least one of the pins.

19. The assembly of claim 18, wherein each pin extends along a pin axis, and wherein the structure includes a first support member aligned with the pin axis of one pin and a second support member aligned with the pin axis of the other pin.

20. The assembly of claim 19, wherein the first portion of the pins and the second portion of the pins have a non-circular cross-section in a plane perpendicular to the pin axis.

21. The assembly of claim 12, wherein the structure is integrally formed with the one of the side plates and the associated flight.

22. The assembly of claim 21, wherein the pair of flight pins, the pair of side plates and the pair of flights are integrally formed as a unitary structure.

23. The assembly of claim 12, further comprising a second structure connected to and extending between the side plates, the second structure preventing at least one of movement of the side plates toward one another and movement of the side plates away from one another.

24. The assembly of claim 12, wherein each side plate has an inner side toward the other side plate and an outer side opposite the inner side, and wherein the structure includes a u-shaped support member including a base and a pair of arms, one of the base and pair of arms being coupled to the outer side of the one of the side plates, the other of the base and the pair of arms being coupled to the associated flight.

25. The assembly of claim 24, wherein the base is coupled to the associate flight and the pair of arms is coupled to the one of the side plates.

26. A chain flight assembly for a chain conveyor, the assembly comprising:
   a pair of flight pins, the pins being arranged in parallel and spaced apart from one another, each pin having a first end and a second end;

a pair of side plates on the pins, the side plates being arranged in parallel and spaced apart from one another, the pins being connected to and extending between the side plates;

a pair of flights, one flight being on the first ends of the pins and the other flight being on the second ends of the pins, a first portion of the pins being connected to and extending between one side plate and the one flight, a second portion of the pins being connected to and extending between the other side plate and the other flight;

first structure, separate from the pins, connected to and extending between the side plates, the first structure preventing at least one of movement of the side plates toward one another and movement of the side plates away from one another; and second structure connected to and extending between each side plate and an associated flight.

27. A method of manufacturing a chain flight assembly, the method comprising:

casting, as a unitary piece, the chain flight assembly, the cast chain flight assembly including a pair of flight pins, the pins being arranged in parallel and spaced apart from one another, each pin having a first end and a second end, a pair of side plates on the pins, the side plates being arranged in parallel and spaced apart from one another, and a pair of flights, one flight being on the first ends of the pins and the other flight being on the second ends of the pins, a first portion of the pins being connected to and extending between one side plate and the one flight, a second portion of the pins being connected to and extending between the other side plate and the other flight.

28. The method of claim 27, wherein casting includes lost foam casting the chain flight assembly.

* * * * *